United States Patent [19]
Kubota et al.

[11] Patent Number: 6,063,003
[45] Date of Patent: May 16, 2000

[54] CONTROL SYSTEM OF VEHICLE HAVING CONTINUOUSLY VARIABLE TRANSMISSION

[75] Inventors: Hirofumi Kubota, Toyota; Yasushi Ito, Susono, both of Japan

[73] Assignee: Toyota Jidosha Kabushiki Kaisha, Toyota, Japan

[21] Appl. No.: 09/289,396

[22] Filed: Apr. 12, 1999

[30] Foreign Application Priority Data

Apr. 28, 1998 [JP] Japan ................................ 10-119772

[51] Int. Cl.⁷ ............................. F16H 9/00; B60K 41/12
[52] U.S. Cl. .......................................................... 477/43
[58] Field of Search ........................................ 477/43, 48

[56] References Cited

U.S. PATENT DOCUMENTS

| | | | |
|---|---|---|---|
| 4,735,114 | 4/1988 | Satoh et al. | 477/43 |
| 5,521,819 | 5/1996 | Greenwood | 477/43 |
| 5,559,694 | 9/1996 | Kraemer et al. | 477/43 |

FOREIGN PATENT DOCUMENTS 8-177997   7/1996   Japan .

*Primary Examiner*—Dirk Wright
*Attorney, Agent, or Firm*—Oblon, Spivak, McClelland, Maier & Neustadt, P.C.

[57] ABSTRACT

A control system of a vehicle having a continuously variable transmission, in which the continuously variable transmission capable of changing a gear ratio continuously is coupled to the output side of a power source to control the output torque of the power source in accordance with an inertial torque established by changing the gear ratio. The output torque of the power source is controlled to a torque which is based on the inertial torque and a target torque based on a demand for changing a driving force.

20 Claims, 15 Drawing Sheets

CONTROL SYSTEM OF VEHICLE HAVING CONTINUOUSLY VARIABLE TRANSMISSION

BACKGROUND OF THE INVENTION

1. Field of the Invention

The present invention relates to a control system of a vehicle having a continuously variable transmission capable of changing a gear ratio continuously and, more particularly, to a system for executing a control of suppressing the longitudinal vibration surges of a vehicle body when a driving force changes.

2. Related Art

It is known in the vehicle having the continuously variable transmission that the longitudinal vibration surges of the vehicle body occur at the time of ending a shift when a gear ratio is raised on the basis of either a demand for an acceleration or a demand for raising an output, as effected by depressing an accelerator pedal. This phenomenon is called the "backing" or "transient surge", as caused by an inertial torque or the elasticity of a power transmission line. When the gear ratio is raised for a demand for raising the output of a power source such as an engine or a demand for the acceleration, more specifically, the speed of a rotary member to participate in the transmission of the power changes to establish an inertial torque according to the change (in terms of an angular acceleration) of the rotating speed or to the inertial moment. When the shift is ended so that the speed of the rotary member is stabilized to a target speed, moreover, the inertial torque is released, as called so. As a result, the driving torque is temporarily raised by the inertial torque so that the longitudinal vibrations are caused by the torsional elasticity of the power transmission line.

A system for suppressing the vehicular longitudinal vibrations of that kind is disclosed in Japanese Patent Laid-Open No. 8-177997(JPA 8-177997). The system disclosed is constructed such that the vehicular longitudinal vibrations are suppressed by controlling the gear ratio. In this system, the shift ending time is determined on the basis of a target gear ratio and a actual gear ratio, and the half period of the vehicular longitudinal vibrations, as anticipated to occur at the shift ending time, is predicted on the basis of both an input torque to the transmission and an actual gear ratio. Moreover, the system is constructed such that the gear ratio is forcibly corrected to a higher speed side at an instant one half period of the vehicular longitudinal vibrations before the shift ending instant. With this control, therefore, about one half of the inertial torque is released at the instant one half period before the shift ending instant so that the peak of the accompanying vibrations coincides substantially with the shift ending instant. When the torque by the vibrations then lowers, the remaining inertial torque is released so that it acts to suppress the vibrations.

Here, the vehicular longitudinal vibrations may occur not only when the driving force changes but also when the output torque of the power source such as the engine is raised not only by changing the driving force by the inertial torque at the shift ending time but also by an accelerating operation, as effected by depressing the accelerator pedal. Since the aforementioned control system of the prior art is constructed to control the gear ratio only at the shift ending time, however, the vehicular longitudinal vibrations at the acceleration starting time cannot always be suppressed. On the other hand, the control system controls the gear ratio of the continuously variable transmission so as to suppress the vehicular longitudinal vibrations, but the control responsiveness at the time of controlling the gear ratio of the continuously variable transmission is not always higher than the control responsiveness of the output of the power source. As a result, the vibrations may occur due to the delay in the response, or the control for eliminating this may be complicated.

Here, the above-specified Laid-Open describes the reduction in the engine torque in addition to the forced control of the gear ratio to the higher speed side as the control for suppressing the vehicular longitudinal vibrations at the shift ending time. However, the control of the engine torque aids in the control of suppressing the vehicular longitudinal vibrations with the control of the gear ratio. After all, therefore, the vehicular longitudinal vibrations may not be suppressed sufficiently or reliably due to the delay in the control of the gear ratio.

SUMMARY OF THE INVENTION

A primary object of the invention is to provide a control system which can suppress the vehicular longitudinal vibrations effectively when both the output of the power source and the gear ratio change.

Another object of the invention is to provide a control system which is enabled, when a change in the driving force is demanded in a vehicle having a continuously variable transmission capable of changing the gear ratio continuously, to suppress the vehicular longitudinal vibrations effectively by controlling the output torque of the power source and the shifting rate of the gear ratio.

In this control system of the invention, when an inertial torque is established with a change in the gear ratio, i.e., with a shift, the output torque of the power source is controlled to the torque according to a target torque, as based on the demand for changing the driving force, and that inertial torque.

According to the invention, even at the start of a shift to be caused according to a demand for changing the output of the power source, the vehicular longitudinal vibrations, as caused due to the change in the driving force, can be effectively suppressed. Since the control is made to suppress the vehicular longitudinal vibrations with the output of the power source, moreover, the driving force or the gear ratio can be changed for a short time period so that the shift responsiveness or the acceleration is improved.

In the control system of the invention, on the other hand, the output torque of the power source is controlled on the basis of the inertial torque accompanying the start of the change in the gear ratio, so as to establish no pulsation in the driving torque. At the shift starting time, therefore, the inertial torque to accompany the shift can be controlled to offset or supplement with the output torque of the power source. As a result, the feeling of shortage or excess of the driving torque at the shift starting time can be avoided in advance.

In the control system of the invention, the output torque of the power source is controlled on the basis of the inertial torque at a shift ending time so as to establish no pulsation in the driving torque. When the gear ratio reaches the target gear rate at the shift ending time so that the shifting rate becomes substantial zero, therefore, the output torque of the power source changes to offset or supplement the inertial torque accompanying the change in the shifting rate. As a result, the overshoot or fall of the driving torque and the vehicular longitudinal vibrations, as caused thereby, can be reliably prevented.

In the control system of the invention, the inertial torque at the shift ending time and an allowable change in the output torque of the power source are compared, and the shifting rate is lowered immediately before the shift end when the inertial torque is larger than the allowable change in the output torque of the power source. When the inertial torque to occur at the shift ending time cannot be offset or supplemented by the output torque of the power source, therefore, the shifting rate is changed in advance. As a result, the vehicular longitudinal vibrations can be effectively suppressed or prevented by avoiding the influences due to the inertial torque at the shift ending time.

In the control system of the invention, the output torque of the power source is changed stepwise by a plurality of torques which are divided from an inertial torque to be anticipated to occur at a shift starting time or at a shift ending time, and the shifting rate is changed in conformity with the stepwise change in the output torque of the power source. Thus, the influences of the inertial torque when the gear ratio changes are eliminated by both the output torque of the power source and the shifting rate so that the change in the driving torque can be smoothed to prevent the vehicular longitudinal vibrations effectively.

According to the invention, there is provided a control system for a vehicle having a continuously variable transmission capable of changing a gear ratio continuously coupled to the output side of a power source, in which the vehicular longitudinal vibrations, as caused by the change in the output of the power source or by the change in a shifting rate by the continuously variable transmission, are suppressed by controlling at least one of the output of the power source and the shifting rate by the continuously variable transmission, and there is inhibited a change in a control schedule to control the other of the output of the power source and the shifting rate by the continuously variable transmission while the control of suppressing the vehicular longitudinal vibrations is being executed. As a result, the condition for premising the control of suppressing the vehicular longitudinal vibrations, i.e., the predicted value or the imagined value of the output of the power source or the shifting rate does not change during the suppressing control so that the control of suppressing the vehicular longitudinal vibrations can be satisfactorily executed.

According to the invention, there is provided a control system for a vehicle having a continuously variable transmission capable of changing a gear ratio continuously coupled to the output side of a power source, for making a shift while keeping the shifting rate constant for a predetermined period based on the demand of a shift, in which there are compared the predetermined period and a control period, for which vehicular longitudinal vibrations are suppressed by changing the output torque of the power source, that is, a torque control period which is determined on the basis of the period of the vehicular longitudinal vibrations. The output torque of the power source to suppress the vehicular longitudinal vibrations is changed when the torque control period is longer than the predetermined period. The shifting rate to suppress the vehicular longitudinal vibrations is controlled when the torque control period is no longer than the predetermined period. As a result, the control for suppressing the vehicular longitudinal vibrations is frequently executed by controlling the output torque of the power source so that the vehicular longitudinal vibrations can be more effectively suppressed or prevented.

According to the invention, there is provided a control system for a vehicle having a continuously variable transmission capable of changing a gear ratio continuously coupled to the output side of a power source, in which the suppression of the vehicular longitudinal vibrations, as caused by a shift, is preferred by changing the shifting rate when it is detected that the control responsiveness of the output torque of the power source is low. As a result, the insufficient control of the vehicular longitudinal vibrations caused by that the output torque of the power source fails to be the control target value can be avoided in advance to effect the control of suppressing the vehicular longitudinal vibrations.

According to the invention, moreover, there is provided a control system for a vehicle having a continuously variable transmission capable of changing a gear ratio continuously coupled to the output side of a power source, in which the start of a shift and a later timing are detected. The control of an output torque of the power source for suppressing the vehicular longitudinal vibrations is executed when the start of the shift is detected. The control of the shifting rate by the continuously variable transmission to suppress the vehicular longitudinal vibrations is executed after the control of suppressing the vehicular longitudinal vibrations by the output torque of the power source. As a result, the vehicular longitudinal vibrations can be reliably suppressed or prevented even if the shifting rate is raised at the shift starting time, so that the time period for the shift can be shortened to improve the shift responsiveness or the acceleration.

The above and further objects and novel features of the invention will more fully appear from the following detailed description when the same is read with reference to the accompanying drawings. It is to be expressly understood, however, that the drawings are for the purpose of illustration only and are not intended as a definition of the limits of the invention.

DESCRIPTION OF THE PREFERRED EMBODIMENTS

Figure 22:
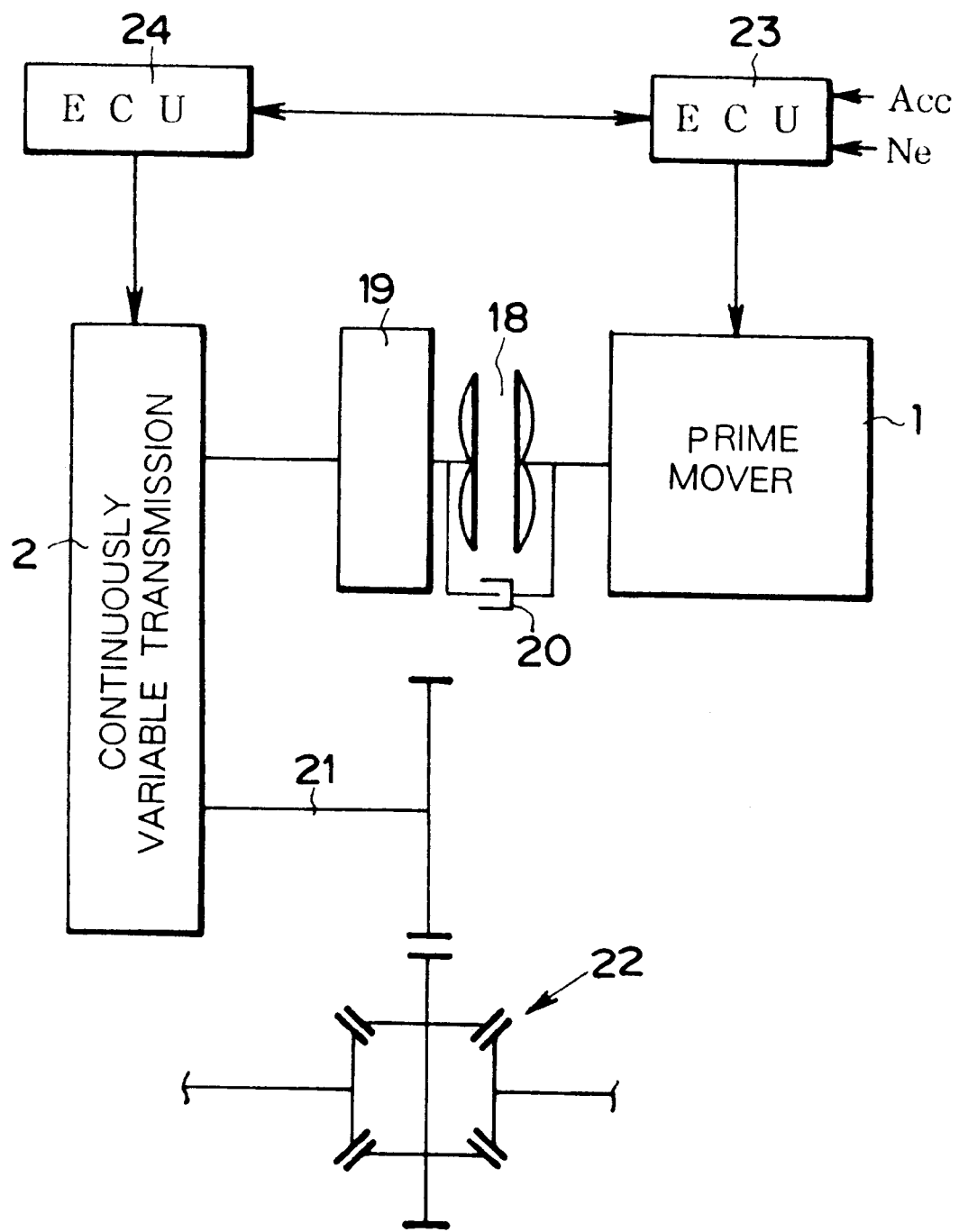
FIG. 22 is a block diagram schematically showing one example of a power transmission line to which the invention can be applied.

The invention will be described in connection with specific embodiments with reference to the accompanying drawings. In FIG. 22, the vehicle to which the invention is applied is one in which a continuously variable transmission 2 is coupled to the output side of a power source 1. This power source 1 can be exemplified not only by an internal combustion engine such as a gasoline engine or a Diesel engine but also by an electric motor or a combination of an internal combustion engine and an electric motor. Especially, the power source 1 to which the invention is applied has to be so constructed that the output can be arbitrarily controlled without any manual operation, and is exemplified by the type of engine which is equipped with an electronic control throttle valve or in which a fuel is injected directly into a cylinder.

Figure 23:
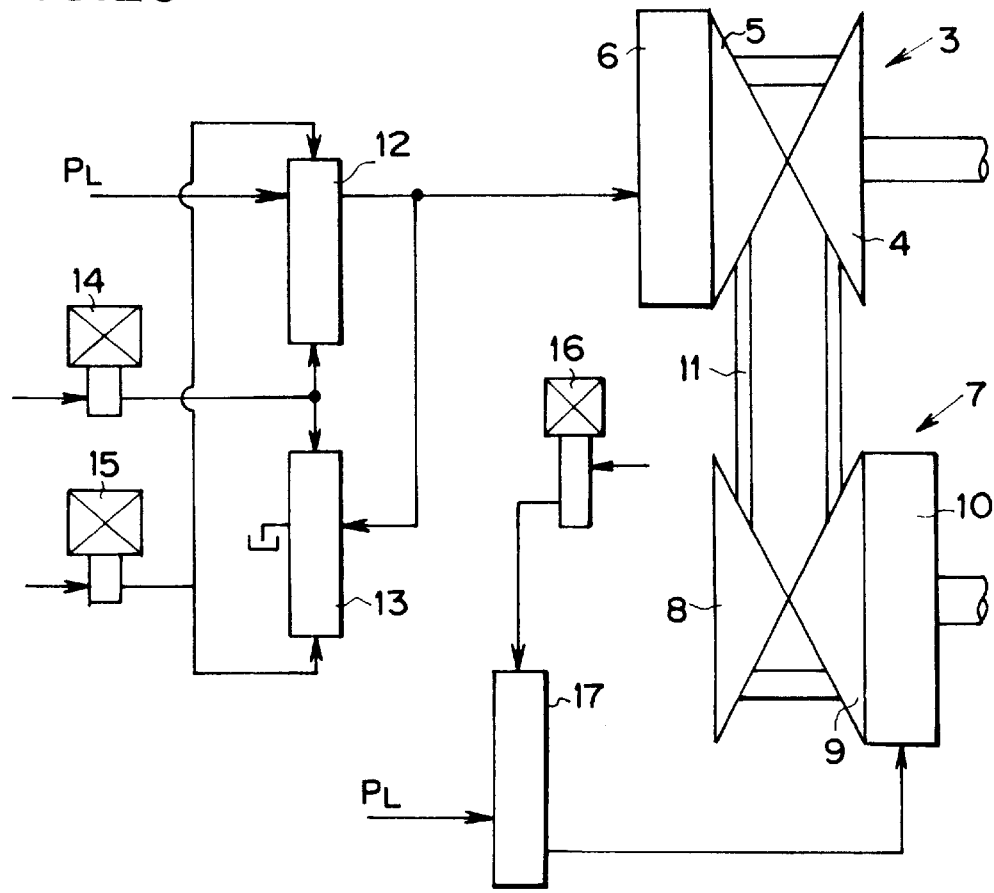
FIG. 23 is a diagram schematically showing a portion of a hydraulic control circuit for controlling the shifts of a belt-type continuously variable transmission.

On the other hand, the continuously variable transmission 2 is one capable of changing the gear ratio continuously. As this continuously variable transmission, there can be adopted either a belt type continuously variable transmission which is caused to make the shift by changing the groove widths of a drive side pulley and a driven side pulley hydraulically to change the winding radius of a belt made to run on the pulleys, or a toroidal type continuously variable transmission which is caused to make the shift by interposing a power roller between a pair of discs having toroidal faces and by inclining the power roller to change the radius of the contact point with the discs. In the belt type continuously variable transmission, the gear ratio is changed by changing the groove widths of the individual pulleys while keeping the tension to be applied to the belt constant, so that the changing rate of the groove widths becomes the shifting rate. By controlling the oil pressure to be fed to and discharged from an actuator for driving the movable sheaves of the individual pulleys, therefore, the shifting rate can be arbitrarily controlled. One example of the hydraulic circuit is shown in FIG. 23.

A drive side pulley (or primary pulley) 3 is constructed to change its groove width by bringing a movable sheave 5 toward and away from a stationary sheave 4 by a hydraulic actuator 6. Likewise, a driven side pulley (or secondary pulley) 7, as arranged in parallel with the drive side pulley 3, is also constructed to change its groove width by bringing a movable sheave 9 toward and away from a stationary sheave 8 by a hydraulic actuator 10. Moreover, a belt 11 is made to run on those pulleys 3 and 7. Here, the positions of the stationary sheaves 3 and 8 and the movable sheaves 5 and 10 of the individual pulleys 3 and 7 in the axial direction are so inverted from each other that the centers of the grooves of those pulleys 3 and 7 may always be held in predetermined positions.

To the hydraulic actuator 6 in the drive side pulley 3, there are connected an acceleration valve 12 and a deceleration valve 13. Of these, the acceleration valve 12 is of the spool type, in which the output pressure of a first solenoid valve 14 to be subjected to a duty control and the output pressure of a second solenoid valve 15 to be subjected to an ON/OFF control are fed against each other to the both end portions of the accelerator valve 12. To the input port, moreover, there is fed a line pressure PL which is regulated according to an accelerator opening or a throttle opening. Therefore, the acceleration valve 12 is constructed to output the oil pressure, as responding to a signal pressure outputted from the first solenoid valve 14, to the hydraulic actuator 6.

On the other hand, the deceleration valve 13 is of the spool type in which the signal pressure outputted from the first solenoid valve 14 and the signal pressure outputted from the second solenoid valve 15 are fed against each other to the both end portions of the deceleration valve 13. Moreover, the input port is connected to the hydraulic actuator 6 so that the input port or the hydraulic actuator 6 is given the communication with the drain in accordance with the ON/OFF state of the second solenoid valve 15.

To the hydraulic actuator 10 of the driven side pulley 7, moreover, there is connected a regulator valve 17 for controlling a regulation level with a signal pressure of a linear solenoid valve 16. This regulator valve 17 regulates an original pressure or the line pressure PL in accordance with the signal pressure of the linear solenoid valve 16 and controls the oil pressure of the hydraulic actuator 10 so that the load for the stationary sheave 8 and the movable sheave 9 of the driven side pulley 7 to clamp the belt 11, i.e., the tension of the belt 11 may take a predetermined value at all times.

In the hydraulic circuit thus constructed, therefore, the drive side hydraulic actuator 6 is shut off from the drain by the deceleration valve 13, and the output pressure of the acceleration valve 12 is raised in the shut-off state so that the drive side movable sheave 5 moves toward the stationary sheave 4 to narrow the groove width of the drive side pulley 3. As a result, the tension to be applied to the belt 11 rises, but the oil pressure of the driven side hydraulic actuator 10 is controlled at the predetermined level, so that the groove width of the driven side pulley 7 is narrowed. In other words, the winding radius of the belt 11 on the drive side pulley 3 increases, but the winding radius of the belt 11 on the driven side pulley 7 decreases, so that the gear ratio lowers.

If the drive side hydraulic actuator 6 is made to communicate with the drain by the deceleration valve 13, on the other hand, the movable sheave 5 is retracted by the tension of the belt 11 to widen the groove width of the drive side pulley 3 but narrow the groove width of the driven side pulley 7. As a result, the winding radius of the belt 11 on the drive side pulley 3 decreases whereas the winding radius of the belt 11 on the driven side pulley 7 increases, so that the gear ratio rises.

Between the aforementioned power source (as will be called the "tengine") 1 and the continuously variable transmission 2, there are arranged a transmission mechanism 18 and a forward/backward switching mechanism 19. Of these, the transmission mechanism 18 is basically provided for operating the engine 1 continuously even when the vehicle stops, and can be exemplified by a torque converter which is equipped with a lockup clutch 20. In addition, it is possible to adopt the mechanism known in the prior art, such as an electromagnetic clutch, a fluid coupling, a powder clutch or a dry clutch. On the other hand, the forward/backward switching mechanism 19 is provided because the rotating direction of the engine 1 is limited to one direction and because the continuously variable transmission 2 has no inverse action. As the switching mechanism 19, there can be adopted a mechanism which is composed mainly of a planetary gear mechanism or a mechanism which is equipped with a reverse gear and a synchronous coupling mechanism.

Here, a differential 22 is coupled through a gear to an output shaft 21 of the continuously variable transmission 2.

For controlling the engine 1 and the continuously variable transmission 2, respectively, there are provided electronic control units (ECU) 23 and 24. These electronic control units 23 and 24 are individually constructed mainly of microcomputers. The electronic control unit 23 for the engine is fed with data such as an accelerator opening Acc and an engine speed Ne. Moreover, those electronic control units 23 and 24 are so connected as to transmit the data to each other. Moreover, the electronic control units 23 and 24 are constructed to control the output of the engine 1 in accordance with the data inputted and a program stored in advance and to control the gear ratio and the shifting rate in the continuously variable transmission 2.

Figure 1:
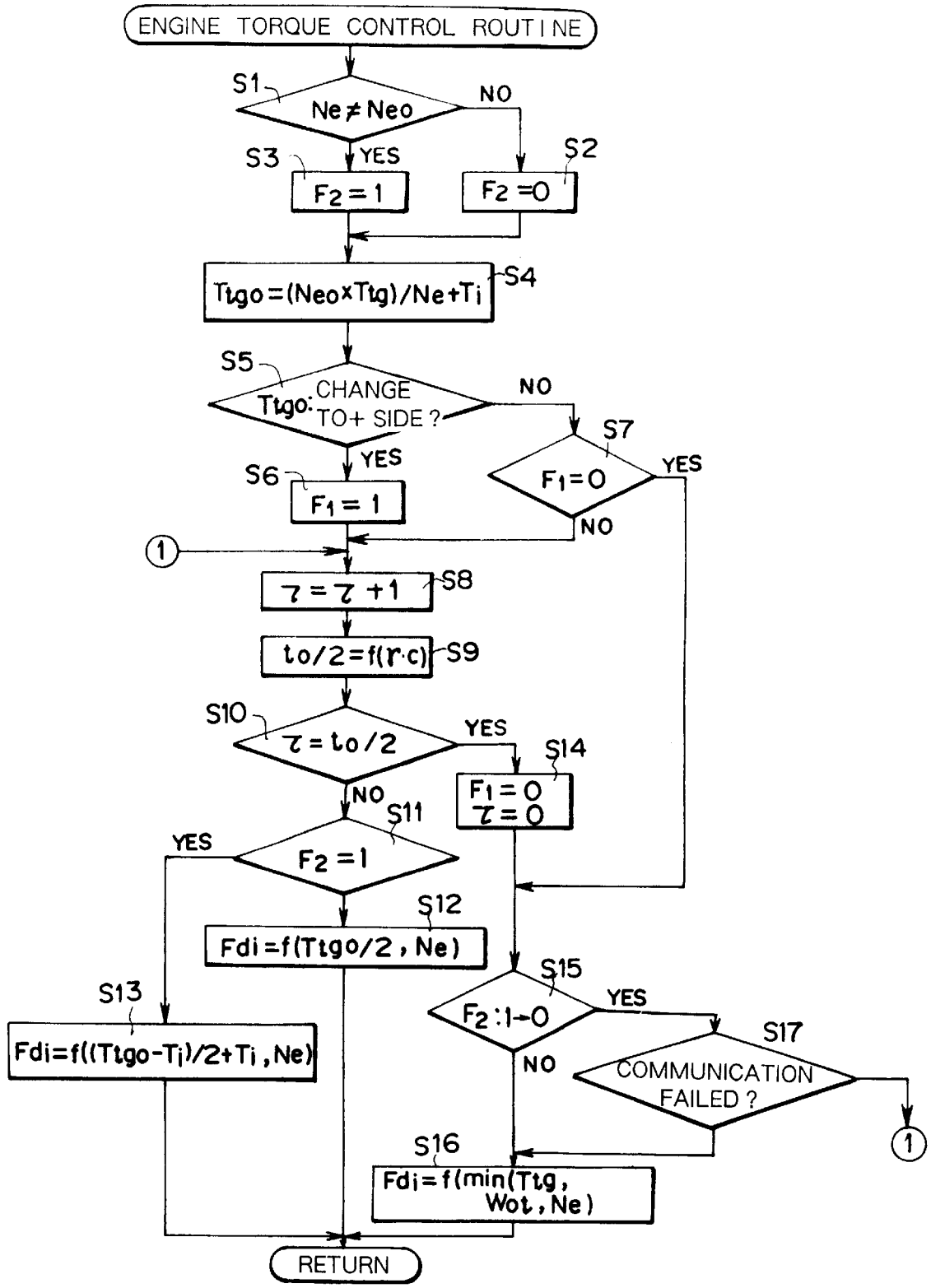
FIG. 1 is a flow chart showing one example of a control routine to be executed in a system of the invention, for suppressing the longitudinal vibrations of a vehicle with an engine torque.

A control system according to the invention controls, when the (not-shown) accelerator pedal is actuated to change its opening Acc, the engine output accordingly and controls the gear ratio, if necessary. Examples for these controls will be described with reference to FIGS. 1 and 2. FIG. 1 shows one example of the control routine of the engine torque in accordance with the accelerator operation, and this routine is executed at every predetermined short time intervals.

At first Step S1, it is decided whether or not a target engine speed Neo accompanying a demand for changing the engine output by the accelerator operation is different from the actual engine speed Ne at that time. In short, it is decided whether or not the state for executing a shift in accordance with the engine output changing demand is matured. When the state is to change only the engine torque because the demand for changing the engine output is small, i.e., not to execute the shift, the answer of Step S1 is negative, and a flag F2 is set to "0" (at Step S2). When the state is matured to execute the shift because the demand for changing the engine output is large, on the contrary, the target engine speed Neo different from the actual engine speed Ne is set, and the answer of Step S1 is affirmative, so that the flag F2 is set to "1" (at Step S3).

After the operation of Step S2 or Step S3, a target torque Ttgo to be outputted by the engine 1 is calculated. In this calculation, a demand torque is determined by dividing the target horse power, i.e., the product of the target engine speed Neo, as based on the engine output changing demand, and a target engine torque Ttg by the actual engine speed Ne, and an inertial torque Ti, as caused by the change in the rotating speed, is added to that demand torque. Specifically, the following calculation is performed (at Step S4):

$$Ttgo=(Neo \times Ttg)/Ne+Ti.$$

The operation of this Step S4 is executed every time the routine shown in FIG. 1 is executed, so that the target torque is sequentially calculated at every constant periods. Here, the inertial torque Ti can be calculated on the basis of the moment of inertia of the power transmission line (especially, the input side rotary member of the continuously variable transmission 2 and the rotating engine line) and the changing rate of the rotating speed and may be prepared in the form of a map. When no change occurs in the rotating speed of the power transmission line, on the other hand, the inertial torque Ti is zero.

It is decided (at Step S5) whether or not the target torque Ttgo has changed to the plus (+) side on the basis of the calculation result of Step S4. In short, it is decided whether or not the increase in the output (or power-ON) of the engine 1 has been demanded. If in the power-ON, a flag F1 is set to "1" (at Step S6). When the decision of Step S5 is executed immediately after the demand for increasing the engine output, the answer of Step S5 is affirmative, and the routine advances to Step S6. When the decision of Step S5 is made after the control in the power-ON state has already been started, on the contrary, the answer of Step S5 is negative because the target torque at that time makes no change. Then, the routine advances to Step S7, at which it is decided whether or not the flag F1 is at "0". If the control in the power-ON state has already been started, moreover, the answer of Step S7 is negative because the flag F1 is set at "1", and the routine advances to Step S8.

In short, the power-ON state is detected to start the according torque control, and the operation of Step S8 is executed till that control is ended. At this Step S8, the value of a timer τ is incremented by "1", and the time period from the instant of the power-ON is counted. At subsequent Step S9, a half period t0/2 of the vehicular longitudinal vibrations according to the gear ratio γ and a viscosity coefficient C of the drive line is calculated. Specifically, the period of the vehicular longitudinal vibrations, as caused by the change in the torque, accords to the gear ratio γ and the drive line viscosity coefficient C at that time, so that its half period t0/2 becomes a function of the gear ratio γ, as expressed by the following Formula:

$$t0/2=f(\gamma, C).$$

Then, it is decided (at Step S10) whether or not the counted value of the timer τ has reached the aforementioned half period t0/2. Before the time elapsed from the instant of the power-ON fails to reach the half period t0/2 calculated at Step S9, that is, when the answer of Step S10 is negative, it is decided (at Step S11) whether or not the flag F2 is set at "1". When no shift is required even with the demand for increasing the output of the engine 1, the flag F2 is set at "0" so that the answer of Step S11 is negative.

In this case, a control is made so that the engine torque may be one half of the target torque Ttgo determined at Step S4. For a specific content of this control at Step S12, there may be adopted a variety of control methods according to the structure of the power source 1. In the case of the internal combustion engine of the direct fuel injection type, for example, a fuel injection rate Fdi may be set to the value which is calculated on the basis of the half torque Ttgo/2 of the target torque and the engine speed Ne at that time. Here, this fuel injection rate Fdi can be selected and determined from the values which are predetermined as a map using the output torque and the engine speed Ne as parameters.

When the flag F2 is set at "1" so that the answer of Step S11 is affirmative, on the contrary, the control is made to output the torque which is calculated by adding the inertial torque to the demand for increasing the engine torque substantially. Specifically, the power source 1 is controlled (at Step S13) to establish the torque which is calculated by adding the inertial torque Ti to one half of the difference of the target torque Ttgo, as calculated at Step S4, from the inertial torque Ti. In a specific control content, the various control methods may be adopted according to the structure of the power source 1. In the case of the internal combustion engine of the direction fuel injection type, for example, the fuel injection rate Fdi may be set to the value which is calculated on the basis of both the torque which is the sum of one half of the difference of the target torque Ttgo from the inertial torque Ti as determined at Step S4 and the inertial torque Ti, and the engine speed Ne at that time. Here, this fuel injection rate Fdi can be selected and determined from the values which are predetermined as a map using the output torque and the engine speed Ne as parameters.

If the target torque is left as it is while the output torque of the engine 1 is controlled to rise, as described hereinbefore, the answer of Step S5 is negative. In this case, the flag F1 is already set at "1", and the routine advances to Step S8 so that controls similar to the aforementioned ones are continued. When the counted value of the timer γ reaches to the half period t0/2 calculated at Step S9, the answer of Step S10 is affirmative. In this case, the routine advances to Step S14, at which the flag F1 and the timer γ are reset to zero.

It is then decided (at Step S15) whether or not the flag F2 has been switched from "1" to "0". In other words, it is decided whether or not the engine speed Ne has just reached the target speed Neo to end the shift. Immediately after the demand for increasing the output of the engine 1, the flag F2 is set at "1" so that the answer of Step S15 is negative. In this case, the routine advances to Step S16, at which the engine torque is controlled to be the smaller one of the torque, as calculated by subtracting the inertial torque Ti from the target torque Ttgo determined at Step S4, i.e., the torque Ttg, based on the demand for increasing the output of the engine 1, and the maximum torque Wot. In the case of the aforementioned internal combustion engine of the direct fuel injection type, for example, the fuel injection rate is set to the value which is based on the smaller one of the torque Ttg, as based on the increase demand, and the maximum torque Wot, and the engine speed Ne at that time. At this instant, therefore, the output torque of the engine 1 is subtracted by the aforementioned inertial torque. Here, this control of Step S16 is executed by resetting the flag F1 to zero. After this control was started, the answer of Step S7 is affirmed, and the control of Step S16 is continued.

When the answer of Step S15 is affirmative, on the other hand, it is decided (at Step S17) whether or not communications between the individual electronic control units 23 and 24 have failed. If this answer is affirmative, the routine advances to Step S8. Without any failure in the communications, on the other hand, the routine advances to Step S16, at which the control is continued to keep the torque Ttg, as based on the increase demand, or the maximum torque Wot.

Figure 3:
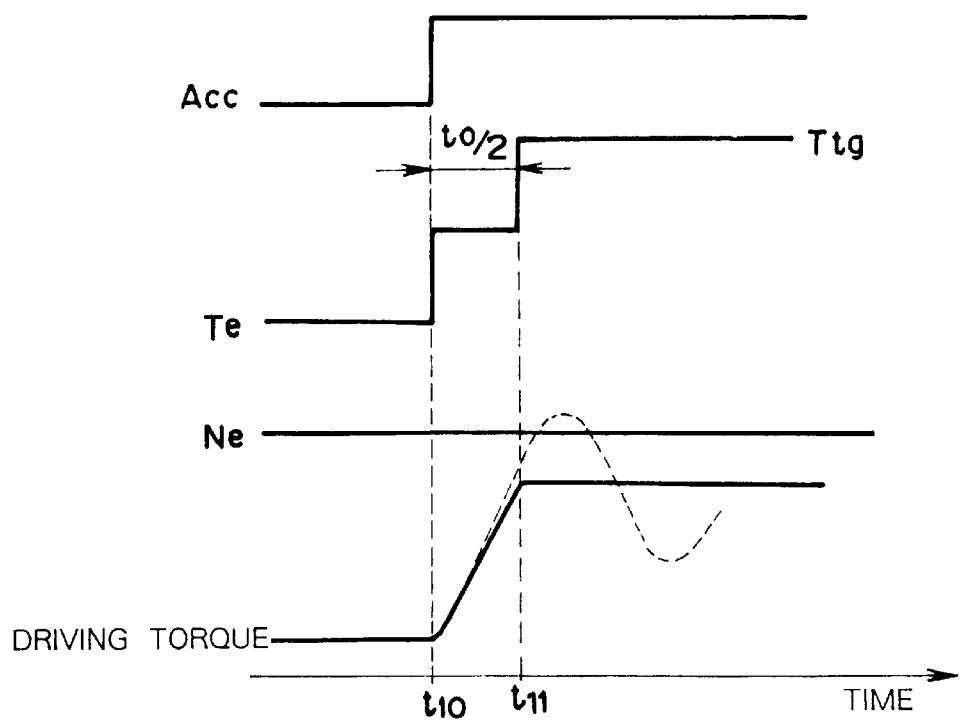
FIG. 3 is a time chart for explaining a torque control example of the case in which only the engine torque is raised.
Figure 4:
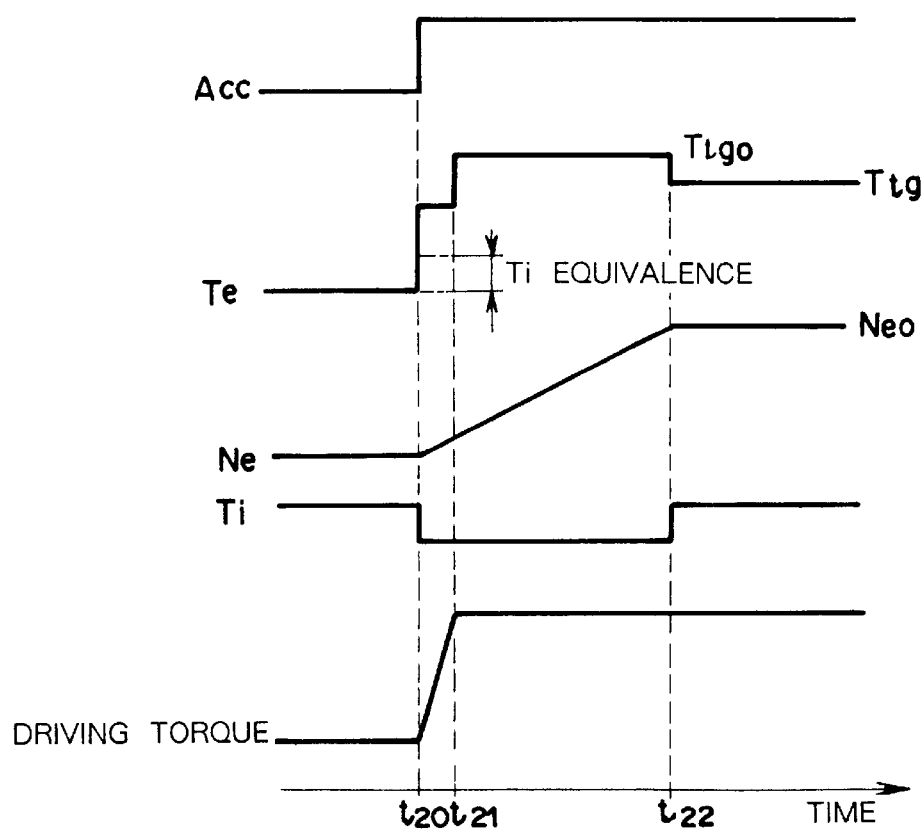
FIG. 4 is a time chart for explaining a control example of the case in which a gear ratio is changed together with the rise in the engine torque.

The time charts for the torque controls thus far described are illustrated in FIGS. 3 and 4. In the example shown in FIG. 3, no shift is caused even with the demand for raising the output of the engine 1, that is, the answer of Step S1 of FIG. 1 is negative. In this case, at an instant t10 when the power-ON is decided, the engine 1 is controlled (at Step S12) to a torque Te which is the half of the target torque Ttg at a value containing no inertial torque. The engine 1 is controlled to the target torque Ttg at an instant t11 when there has elapsed the half period t0/2 of the vehicular longitudinal vibrations, as anticipated to occur due to the rise in the torque. As a result, the driving torque changes so smoothly as indicated by a solid curve, to suppress or prevent the vehicular longitudinal vibrations (or the pulsations of the driving torque) which are caused by raising the engine torque. Here, the driving torque, as indicated by a broken curve in FIG. 3, corresponds to the case in which the aforementioned control is not made, and the driving torque pulsates to cause the vehicular longitudinal vibrations. On the other hand, FIG. 4 illustrates an example of the case in which a shift to a lower speed side occurs together with the demand for raising the output of the engine 1. Simultaneously at an instant t20 when the decision of the power-ON is made, the shift is started to raise the engine speed Ne so that the negative inertial torque Ti accordingly occurs. Therefore, the sum of the half of the torque Ttg, as based on the demand for raising the engine output, and the inertial torque Ti is the engine torque Te. Moreover, the engine torque Te is so controlled (at Step S16) that it may become the target torque Ttgo estimating the inertial torque at an instant t21 when there has elapsed one half of the period of the vehicular longitudinal vibrations which is anticipated to occur due to the rise in the engine torque. As a result, the driving torque rises smoothly without any pulsation so that the vehicular longitudinal vibrations are suppressed or prevented.

Simultaneously as the shifting rate is zero at an instant t22 when the engine speed Ne reaches the target engine speed Neo, moreover, the engine torque Te is set to the torque Ttg satisfying the output increase demand. Simultaneously as the inertial torque is released, as so called, when the shifting rate is zero, more specifically, the engine torque Te is lowered according to the inertial torque so that these torques offset each other, as so called, to suppress or prevent the vehicular longitudinal vibrations or shocks without any fluctuation in the driving torque.

Figure 2:
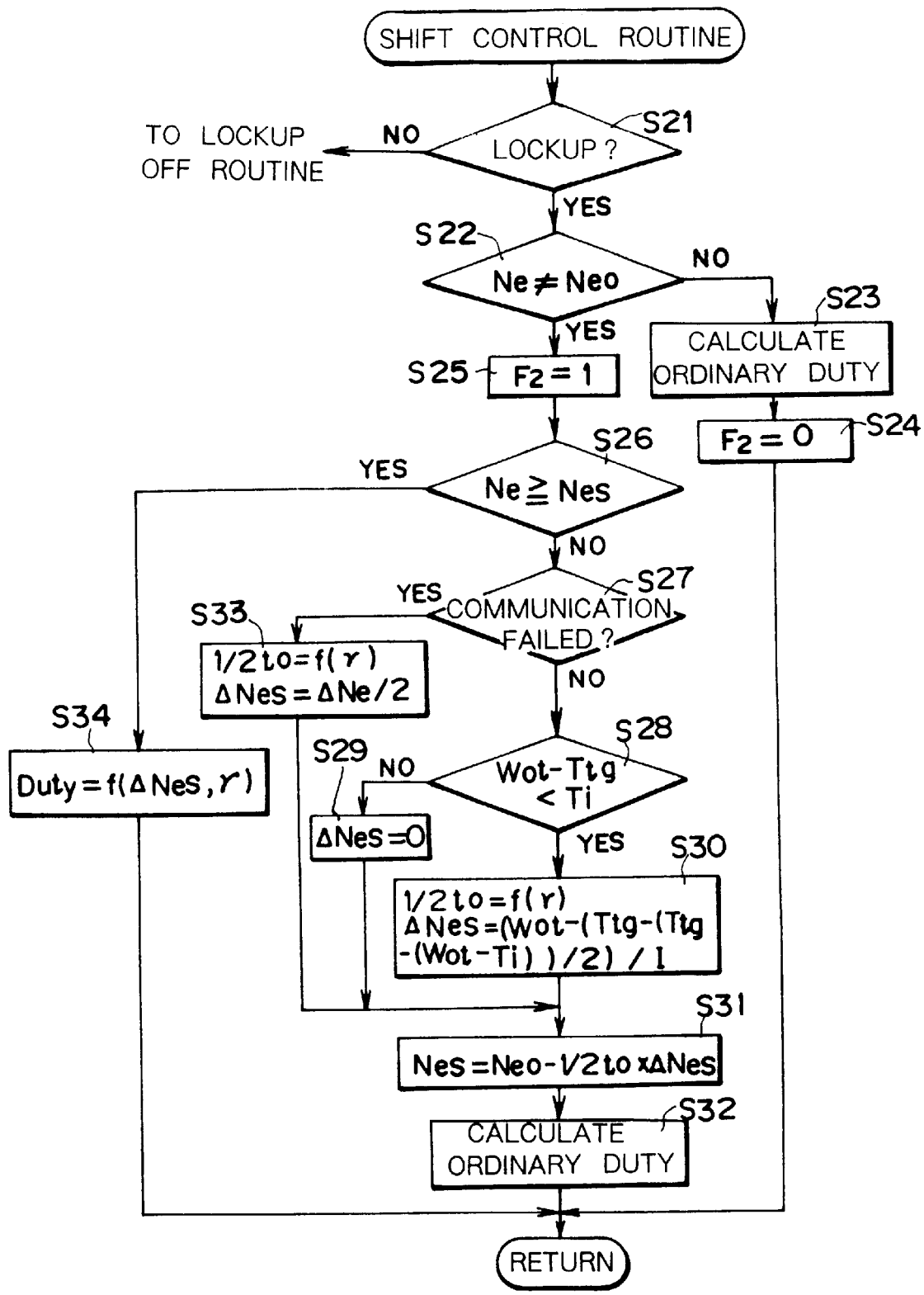
FIG. 2 is a flow chart showing one example of a control routine to be executed in a system of the invention, for suppressing the longitudinal vibrations of a vehicle with a shifting rate.

Here will be described the control for suppressing the vehicular longitudinal vibrations with the shift. FIG. 2 is a flow chart showing one example of the control, and this control is executed at every predetermined time periods as in the control routine shown in FIG. 1. At first Step S21, it is decided whether or not the lockup clutch 20 is applied. When a mechanism for transmitting the torque through a fluid is adopted as the aforementioned transmission mechanism 18, the vibrations are attenuated by the transmission mechanism 18 if the lockup clutch 20 is released, so that a control different from the following control is required. If the lockup clutch 20 is released, therefore, another not-shown routine is followed. When the lockup clutch 20 is applied, on the contrary, it is decided (at Step S22) whether or not the actual engine speed Ne is different from the target speed Neo.

This decision of Step S22 is made similar to that of Step S1 of FIG. 1, and the answer of Step S22 is negated when the demand for raising the engine output is so small that no shift is executed. In this case, the ordinary duty ratio is calculated (at Step S23), and the flag F2 indicating that the engine speed Ne is equal to the target speed Neo is set to "0" (at Step S24). This duty ratio is provided for controlling the first solenoid valve 14 in the hydraulic circuit shown in FIG. 23, and is calculated to equalize the present target engine speed Neo to the engine speed Ne.

When a shift is decided according to the demand for raising the output of the engine 1, on the other hand, the answer of Step S22 is affirmative. In this case, the routine advances to Step S25, at which the flag F2 indicating the shifting operation is set to "1". On the other hand, it is decided (at Step S26) whether or not the engine speed Ne has reached a value Nes for starting the control to suppress the vehicular longitudinal vibrations. In short, it is decided whether or not the actual engine speed Ne exceeds the decision reference value Nes. An abnormally large value is set as the initial value of the reference speed Nes so that the answer of Step S26 is negative at the beginning of the shift start.

When the answer of Step S26 is negative, it is decided (at Step S27) whether or not the data communications between the individual electronic control units 23 and 24 have failed. When the answer of Step S27 is negative because of no failure in the communications, it is decided (at Step S28) whether or not the difference between the maximum torque Wot to be outputted by the engine 1 and the target engine torque Ttg to be set after the shift is smaller than the inertial torque Ti established by the shift.

The control system thus far described according to the invention is constructed such that the vehicular longitudinal vibrations at the end of the shift accompanying the demand for raising the engine torque are suppressed by lowering the engine torque by the inertial torque at the end of the shift. If the target torque Ttgo estimating the inertial torque Ti is more than the maximum torque Wot, therefore, the target torque Ttgo is set to the maximum torque Wot so that the torque is lowered to the target engine torque Ttg. When the target torque Ttgo is limited, therefore, the lowering width of the torque (i.e., the allowed change in the engine torque Te) is smaller than the inertial torque. It is, therefore, decided at Step S28 whether or not such situation occurs.

When the answer of Step S28 is affirmative, the engine torque Te can be lowered by the inertial torque Ti at the end of the shift. In this case, therefore, the engine torque Te is lowered by the inertial torque Ti by the control of Step S16 of FIG. 1 so that the vehicular longitudinal vibrations, as caused by the inertial torque, can be suppressed or prevented. When the answer of Step S28 is affirmative, therefore, the shifting rate ΔNes at the end of the shift is set to "0" (at Step S29). In short, there is not executed the control for suppressing the vehicular longitudinal vibrations by controlling the shifting rate immediately before the end of the shift.

When the lowering width of the engine torque Te at the end of the shift, i.e., the allowed changing value is smaller than the inertial torque, that is, when the answer of Step S28 is affirmative, on the contrary, there are calculated (at Step S30) the half period t0/2 of the vehicular longitudinal vibrations, as may be caused at the end of the shift, and the shifting rate ΔNes for the control to suppress the vehicular longitudinal vibrations. The vehicular longitudinal vibrations to be anticipated to occur at the end of the shift have a period according to the gear ratio γ and the drive line viscosity coefficient C so that their half period t0/2 is determined from the following Formula:

$$t0/2 = f(\gamma, C).$$

On the other hand, the shifting rate ΔNes is expressed, as follows:

$$\Delta Nes = (Wot - (Ttg - (Ttg - (Wot - Ti))/2)/I.$$

Here, letter I designates an inertia moment between the input side rotary member of the continuously variable transmission 2 with the lockup clutch 18 being applied and the rotating engine line.

After the shifting rate ΔNes is set to "0" at Step S29 or after the half period t0/2 and the shifting rate ΔNes are calculated at Step S30, the control starting reference speed Nes of the shifting rate for suppressing the vehicular longitudinal vibrations is calculated (at Step S31). In short:

$$Nes = Neo - t0/2 \times \Delta Nes.$$

In other words, this instant is one half period prior to the instant when the target engine speed Neo is reached.

After this calculation of Step S31, the ordinary duty ratio is calculated (at Step S32). This duty ratio controls the aforementioned first solenoid valve 14 so as to achieve the shifting rate ΔNe which is determined on the basis of the vehicle speed and the target gear ratio. When the answer of Step S27 is affirmative because of a failure in the communications, the half period of the vehicular longitudinal vibrations is calculated on the basis of the gear ratio γ, and the shifting rate ΔNes for suppressing the vehicular longitudinal vibrations is set to one half of the preceding shifting rate ΔNe (at Step S33). On the basis of these values t0/2 and ΔNes, moreover, the aforementioned reference speed Nes is calculated (at Step S31). The reference speed Nes thus determined is updated at Step S26 each time the control routine of FIG. 2 is repeated.

As the shift proceeds, the engine speed Ne gradually rises until it exceeds the reference speed Nes, so that the answer of Step S26 is affirmed. As a result, the duty ratio is set (at Step S34) to achieve the shifting rate ΔNes for suppressing the vehicular longitudinal vibrations. Specifically, the duty ratio is calculated on the basis of a function which is preset by using the shifting rate ΔNes and the gear ratio γ as parameters.

When the engine speed Ne reaches the target speed Neo as a result that the shift is executed by lowering the shifting rate from the instant of the shift end to the instant prior to the half period of the vehicular longitudinal vibrations, the answer of Step S22 is negated, and the routine advances to Step S23. Specifically, the duty ratio is calculated to keep the gear ratio after the shift so that the control of the gear ratio is executed on the basis of the duty ratio. At this instant, on the other hand, the flag F2 is switched from "1" to "0", and the answer of Step S15 of FIG. 1 is affirmed so that the engine torque Te is lowered from the maximum torque Wot to the target torque Ttg.

Figure 5:
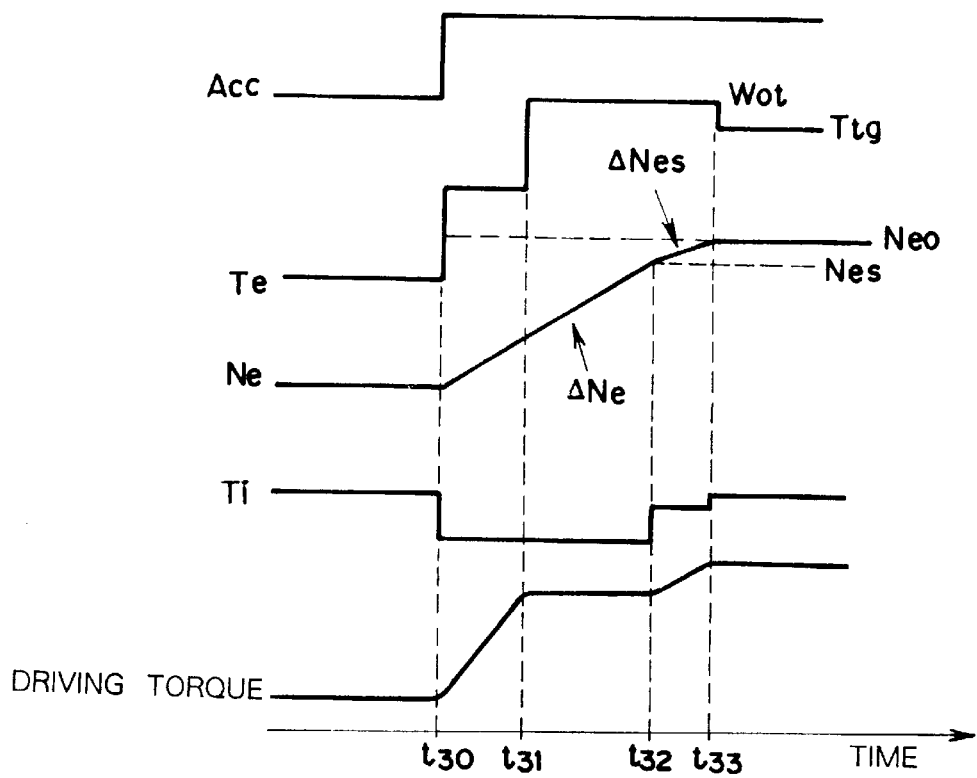
FIG. 5 is a time chart for explaining a control example of the case in which a target torque exceeds the maximum torque.

The time chart for this control is shown in FIG. 5. When the demand for raising the output of the engine 1 is made by depressing the accelerator pedal at an instant t30, the shift is started at the predetermined shifting rate ΔNe to output the torque, to which the accompanying inertial torque is added, of Step S13. This state continues for the half period t0/2 of the vehicular longitudinal vibrations, and the engine torque is then raised to the target torque. If this target torque exceeds the maximum torque Wot, it is set to the maximum torque Wot.

When the shift proceeds the predetermined shifting rate ΔNe so that the engine speed Ne reaches the reference speed Nes calculated at Step S30, the shifting rate lowers at the instant t32 to the rate ΔNes which was determined at Step S30. This shifting rate ΔNes is determined on the basis of the difference between the maximum torque Wot and the target engine torque Ttg, as has been described in connection with Step S30, so that one half or more of the inertial torque Ti is released at the instant t32. At the shift ending instant t33 when the engine speed Ne reaches the target speed Neo, moreover, the remaining inertial torque is released to appear as the driving torque. Simultaneously with this, the engine torque Te is lowered to the target engine torque Ttg. After all, the remaining inertial torque is offset by the reduction in the engine torque so that the driving torque is not overshot. Even when the reduction in the engine torque Te at the shift ending instant is short for the inertial torque Ti, more specifically, the vehicular longitudinal vibrations at the shift end can be effectively suppressed or prevented by performing not only the control of the engine torque to be executed but also the shift control according to the engine torque.

Figure 6:
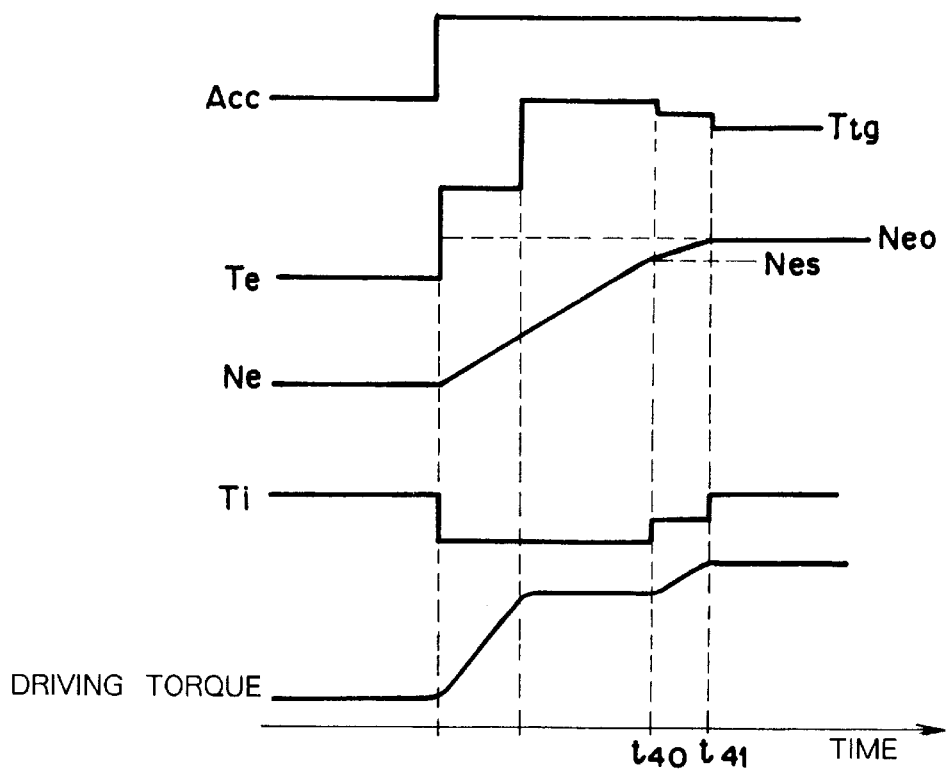
FIG. 6 is a time chart for explaining an example in which both the engine torque and the shifting rate are controlled at the end of a shift.

Here will be described another example of the invention. As has been described with reference to FIGS. 2 and 5, the vehicular longitudinal vibrations (i.e., the pulsations of the driving torque) at the shift end can be suppressed with the engine torque and the shifting rate. If this control is applied to the case in which the reduction in the engine torque is more than the inertial torque, therefore, the vehicular longitudinal vibrations can be effectively suppressed as in the foregoing example. As shown in FIG. 6, more specifically, at an instant t40 earlier than the half period of the vehicular longitudinal vibrations than the shift ending time the shift rate is set to about one half of the preceding value, and simultaneously with this the engine torque Te is lowered to about one half of the inertial torque Ti. This control is continued till the engine speed Ne reaches the target speed Neo, i.e., till a shift ending instant t41, to reduce the shifting rate to zero at the shift ending instant t41 and to lower the engine torque to the target value Ttg.

Figure 7:
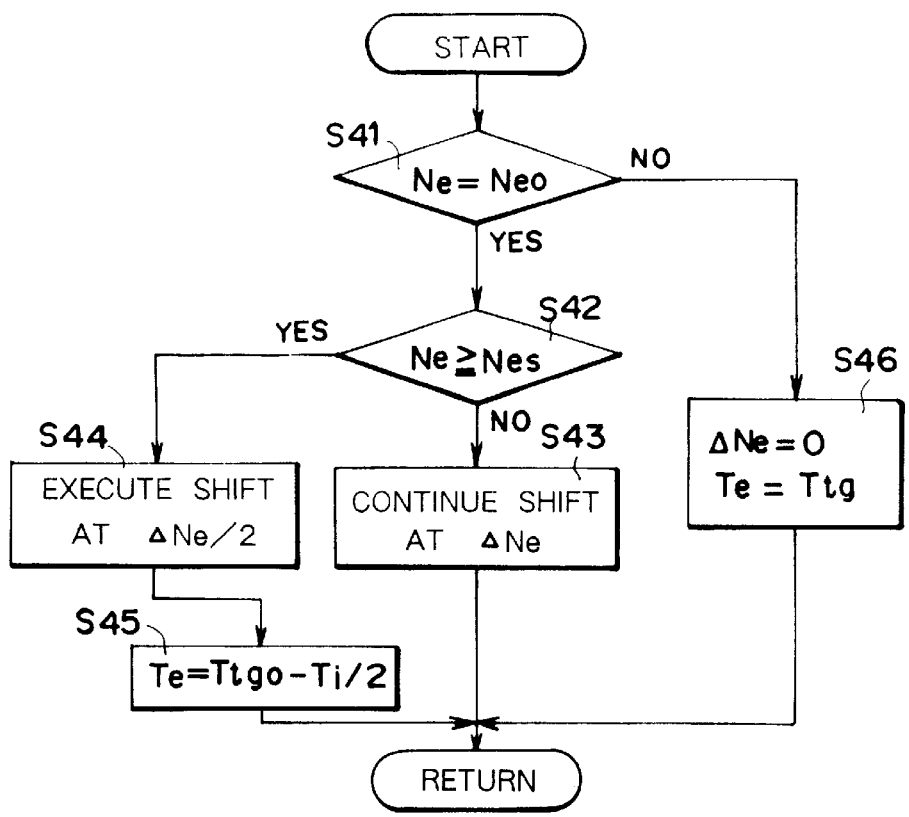
FIG. 7 is a flow chart showing a control routine for the control shown in FIG. 6.

This control example will be briefly described with reference to a flow chart. In FIG. 7, it is decided (at Step S41) whether or not the engine speed Ne differs from the target speed Neo. When the answer of this Step S41 is affirmative because the shift is not ended, it is decided (at Step S42) whether or not the engine speed Ne has reached the speed Nes at which the control for suppressing the vehicular longitudinal vibrations is started. Here, the speed Nes for this reference to the decision takes the value (Neo−t0/2·ΔNe/2) which is lower than the target speed Neo by the speed (t0/2·ΔNe/2) of the case in which the shift is made at the half of the shifting rate ΔNe at the shift starting time for the half period t0/2 of the vehicular longitudinal vibrations. When the answer of Step S42 is negative, the shift is continued at the preceding shifting rate ΔNe (at Step S43). When the shift proceeds so that the engine speed Ne reaches the reference speed Nes to affirm the answer of Step S42, the shifting rate is halved to (ΔNe/2) (at Step S44). Simultaneously with this, the engine torque Te is lowered by one half of the inertial torque Ti from the target torque Ttgo containing the inertial torque (at Step S45).

Moreover, the shift is continued at a halved rate, and the answer of Step S41 is affirmed at the shift ending instant when the half period t0/2 elapsed. In this case, the shifting rate is reduced to substantial zero to keep the target gear ratio, and simultaneously with this the engine torque is lowered to the target engine torque Ttg (at Step S46).

Here will be described the relations between the specific examples thus far described and the invention. The functions of the foregoing Steps S4, S12, S13 and S16 correspond to output torque control means for controlling the output torque of the power source in the invention. On the other hand, the function of Step S28 corresponds to comparing means in the invention, and the functions of Steps S30 and S31 correspond to means for lowering the shifting rate. Moreover, the function of Step S45 corresponds to means for changing the output torque stepwise in the invention, and the function of Step S44 corresponds to means for changing or halving the shifting rate in the invention. In the example shown in FIGS. 6 and 7, therefore, the inertial torque is halved, but the inertial torque may be divided into three or more to change the output torque stepwise so that the shifting rate may be accordingly changed at a plurality of stages.

When the demand for raising the engine output is large, the target engine torque Ttg may exceed the maximum output Wot. From this state of the maximum output Wot, on the other hand, another demand for raising the output may occur. In this case, the control for suppressing the vehicular longitudinal vibrations with the engine torque cannot be executed, and the control is then made in the following manner.

Figure 8:
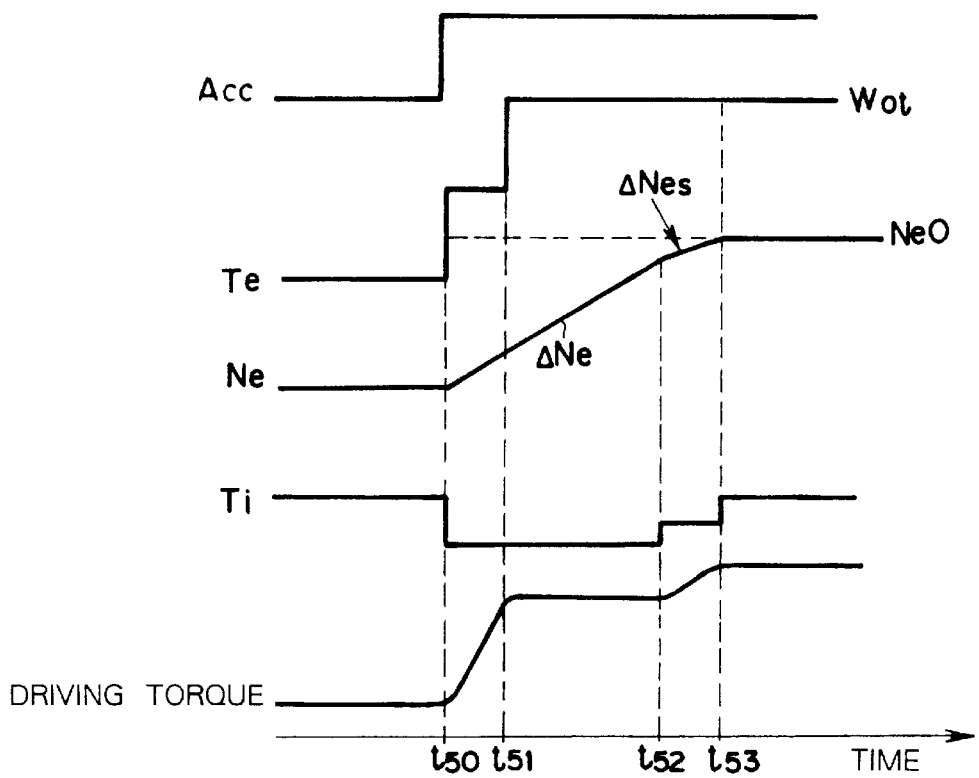
FIG. 8 is a flow chart for explaining a control example of the case in which the target engine torque is more than the maximum torque.

FIG. 8 presents a time chart of the case in which the target engine torque Ttg based on the demand for raising the output of the engine 1 is more than the maximum torque Wot. At an instant t50 when the demand for raising the engine torque is made, the engine torque is raised by the half of the demand for raising the engine torque, and this state is continued for the half period t0/2, as anticipated to occur, of the vehicular longitudinal vibrations. At an instant t51 when a time period corresponding to the half period t0/2 has elapsed, the engine torque is raised to the maximum torque Wot. This control at the beginning of raising the engine output is similar to that of the example which has been described with reference to FIGS. 1 and 4.

Since the engine torque cannot be lowered at the shift end, moreover, the shifting rate ΔNe is lowered to the value ΔNes, i.e., about one half (or the value considering the viscosity of the power transmission line) of the preceding value at an instant t52 which is earlier by the half period t0/2 of the vehicular longitudinal vibrations than a shift ending instant t53. By this control, about one half of the inertial torque accompanying the shift is released at the instant t52 so that the accompanying reduction in the driving torque at the instant t53 is blocked by releasing the remaining inertial torque. As a result, it is possible to suppress or prevent the overshoot of the driving torque and the accompanying vehicular longitudinal vibrations.

Figure 9:
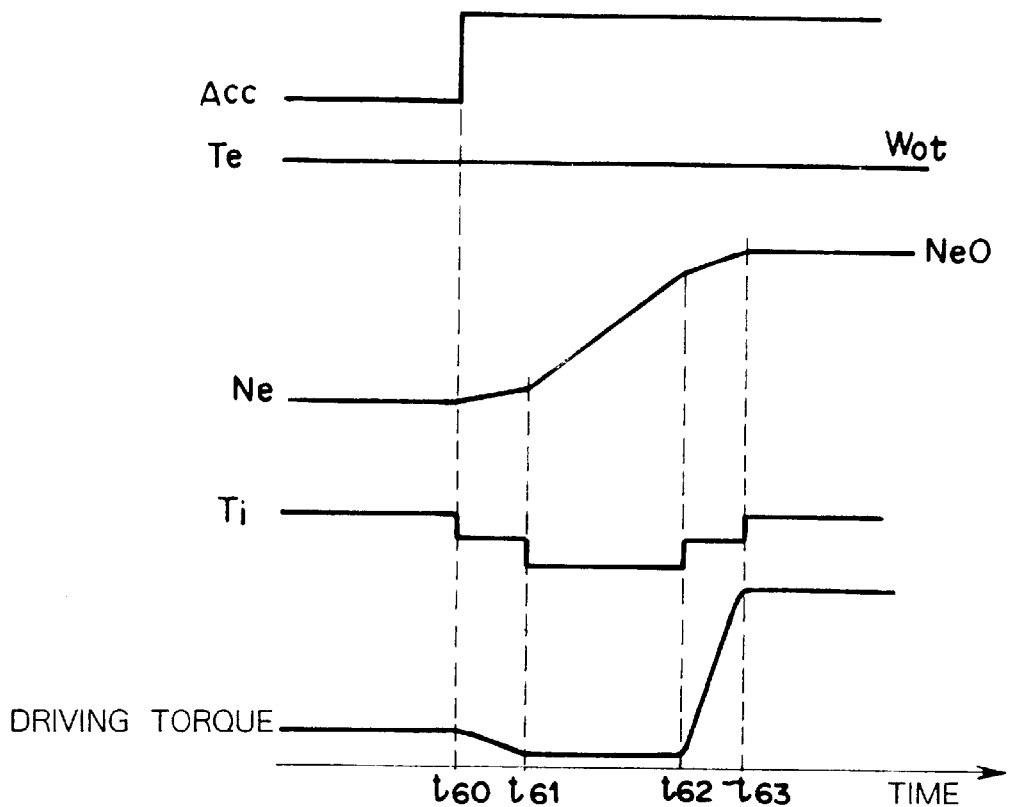
FIG. 9 is a time chart for explaining a control example of the case in which the engine torque has already been more than the maximum torque.

On the other hand, FIG. 9 shows an example of the case in which the engine torque has already reached the maximum torque Wot and in which the rise in the driving torque is further demanded from that state. In this case, the shift occurs, but the engine torque cannot be controlled. Therefore, the shift is started (at an instant t60) at the shifting rate ΔNes of about one half (or the value considering the viscosity of the power transmission line) of the shifting rate ΔNe which is determined by the vehicle speed and the gear ratio. This state is continued for the half period t0/2 of the vehicular longitudinal vibrations, as anticipated to occur in the case of the shift at the shifting rate ΔNe, and the shifting rate at an instant t61 after lapse of that period is raised to the value ΔNe. As a result, the driving torque lowers according to the inertial torque, but the pulsations of the driving torque or the vehicular longitudinal vibrations of the vehicle body can be suppressed or prevented.

At the shift ending time, moreover, the control is made as in the example shown in FIG. 8. At an instant t62 earlier by the half period t0/2 of the vehicular longitudinal vibrations than a shift ending instant t63, more specifically, the shifting rate is halved to the value ΔNes, and the shift is ended by reducing the shifting rate to zero at the instant t63 when the half period t0/2 has elapsed. At the ending time of the shift, therefore, the pulsations of the driving torque or the vehicular longitudinal vibrations can be suppressed or prevented.

Figure 10:
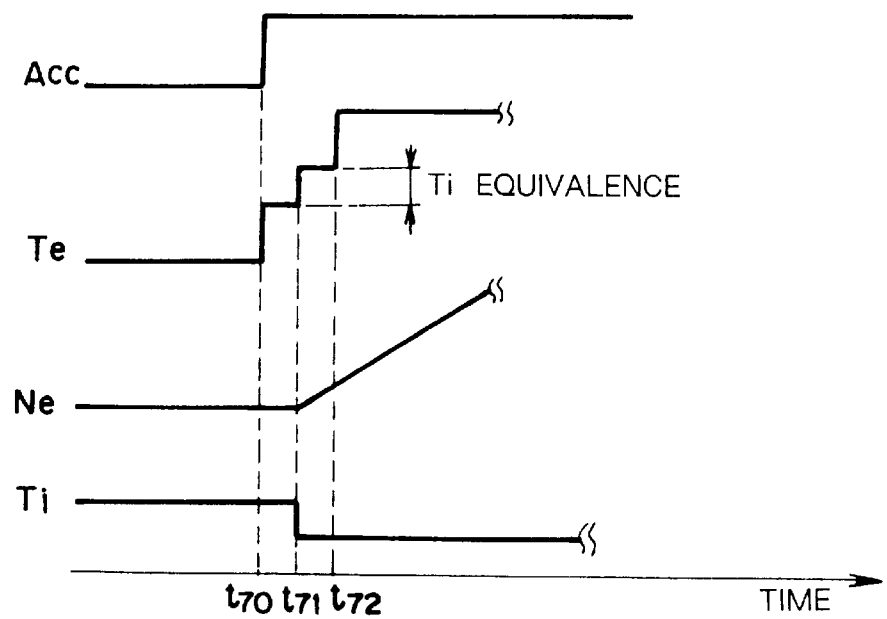
FIG. 10 is a time chart for explaining a control example of the case in which the control start of the shifting rate at the start of a shift is delayed from the control start of the engine torque.

Here, depending upon the construction of the power source 1, the response of the torque control may be higher than the shifting response in the continuously variable transmission 2. In the vehicle having the power transmission line thus constructed, the torque of the engine 1 rises prior to the start of the shift when the rise in the driving force is demanded. FIG. 10 is a time chart for explaining the control example of that case. At an instant t70 when the demand for raising the driving force, i.e., the power-ON is detected, there is outputted one half of the target engine torque Ttg according to the demand. After this, at an instant t71 when the shift is started, the engine torque is raised according to the inertial torque accompanying the shift. At an instant t72 when the half period t0/2 of the vehicular longitudinal vibrations to be anticipated to occur when the engine torque is raised to the target torque has elapsed, moreover, the engine torque is raised up to the target torque Ttgo which is the sum of the target engine torque Ttg and the inertial torque. With this control, the engine torque and the driving torque can be raised without being influenced by the delay in the shift, so that the acceleration response can be improved.

As seen from the specific examples thus far described, the vehicular longitudinal vibrations accompanying the rise in the output torque of the engine 1 and the shift can be suppressed or prevented by controlling the engine torque and the shifting rate to suppress the pulsations or abrupt increase/decrease of the driving torque. In short, both the engine torque and the shifting rate exert influences upon the driving torque. On the contrary, the engine output is basically controlled on the basis of the accelerator operation of the driver, and the gear ratio is changed according to a demand for changing the output such as the accelerator operation. When a demand for the acceleration or deceleration by the accelerator operation is made while the aforementioned control for suppressing the vehicular longitudinal vibrations is being executed, therefore, the engine torque or the shifting rate, as has been described with reference to FIG. 1 or 2, may be changed while it is being controlled. Since the engine torque or the shifting rate at the control time of suppressing the vehicular longitudinal vibrations is determined on the basis of the gear ratio or the throttle opening at that time and the target gear ratio or the target torque, however, the control of suppressing the vehicular longitudinal vibrations is not made, as expected, if the engine torque or the shifting rate is changed while being controlled. As a result, the vehicular longitudinal vibrations may be further deteriorated to the contrary.

Figure 11:
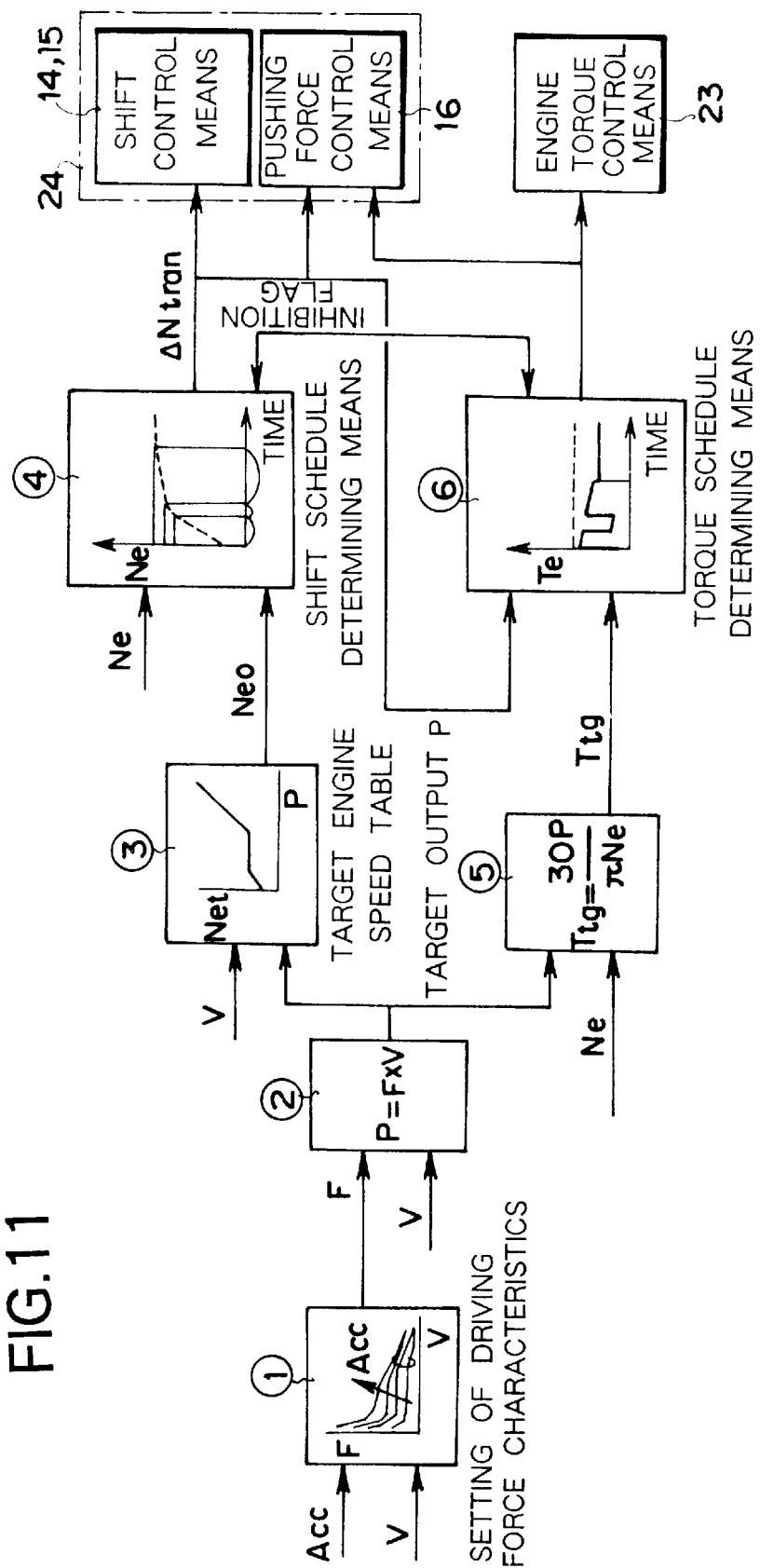
FIG. 11 is a block diagram for explaining steps of determining a shift schedule and a torque schedule at the time of a shift.

In this control system of the invention, therefore, the following control is executed when the engine torque and the gear ratio are to be changed. FIG. 11 is a block diagram for explaining a control process of the case in which an acceleration demand is made. The accelerator opening Acc and a vehicle speed V are read in so that a target driving force F is determined (at Process ①) on the basis of those data and a driving force characteristic diagram. Next, a target output P is determined (at Process ②) on the basis of the target driving force F and the vehicle speed V.

The target engine speed Neo is determined (at Process ③) on the basis of the target output P and the actual vehicle speed V at that time, and the target engine speed table. On the basis of the target engine speed Neo and the actual engine speed Ne, moreover, the so-called "shift schedule" such as the shifting rate up to the target engine speed (or the target gear ratio) and the timing for changing the shifting rate are determined (at Process ④). This determination has been described with reference to FIG. 2. In order to achieve the target shifting rate ΔNtran thus determined, moreover, control signals are outputted from the aforementioned continuously variable transmission electronic control unit 24 to the individual solenoid valves 14 and 15.

On the basis of the target output P determined at Process ② and the actual engine speed Ne, on the other hand, a fundamental target engine torque Ttg is calculated (at Process ⑤). When the shift demand is made according to the demand for raising the engine output, as has been described with reference to FIG. 1, the engine torque is controlled considering the inertial torque which is caused by the shift. On the basis of the fundamental target engine torque Ttg determined at Process ⑤ and the shift schedule determined at Process ④, therefore, the control schedule of the engine torque is determined (at Process ⑥). At this Process ⑥, more specifically, there is determined the control schedule such as the target engine torque Ttgo and the timing to change the engine torque till the target engine torque Ttgo is achieved, on the basis of the fundamental target engine torque Ttg and the inertial torque Ti. In accordance with this schedule, moreover, the control signals are outputted to the engine electronic control unit 23 and the continuously variable transmission electronic control unit 24 so as to change the engine torque.

Thus, the control schedule of the engine torque and the shift schedule are correlated to each other, and the engine torque and the shifting rate are controlled on the basis of those individual schedules. In order to prevent one of the shifting rate control schedule and the engine torque control schedule from changing while being made to disturb the other control schedule, therefore, mutual inhibition controls are executed, as exemplified in FIGS. 12 and 13.

Figure 12:
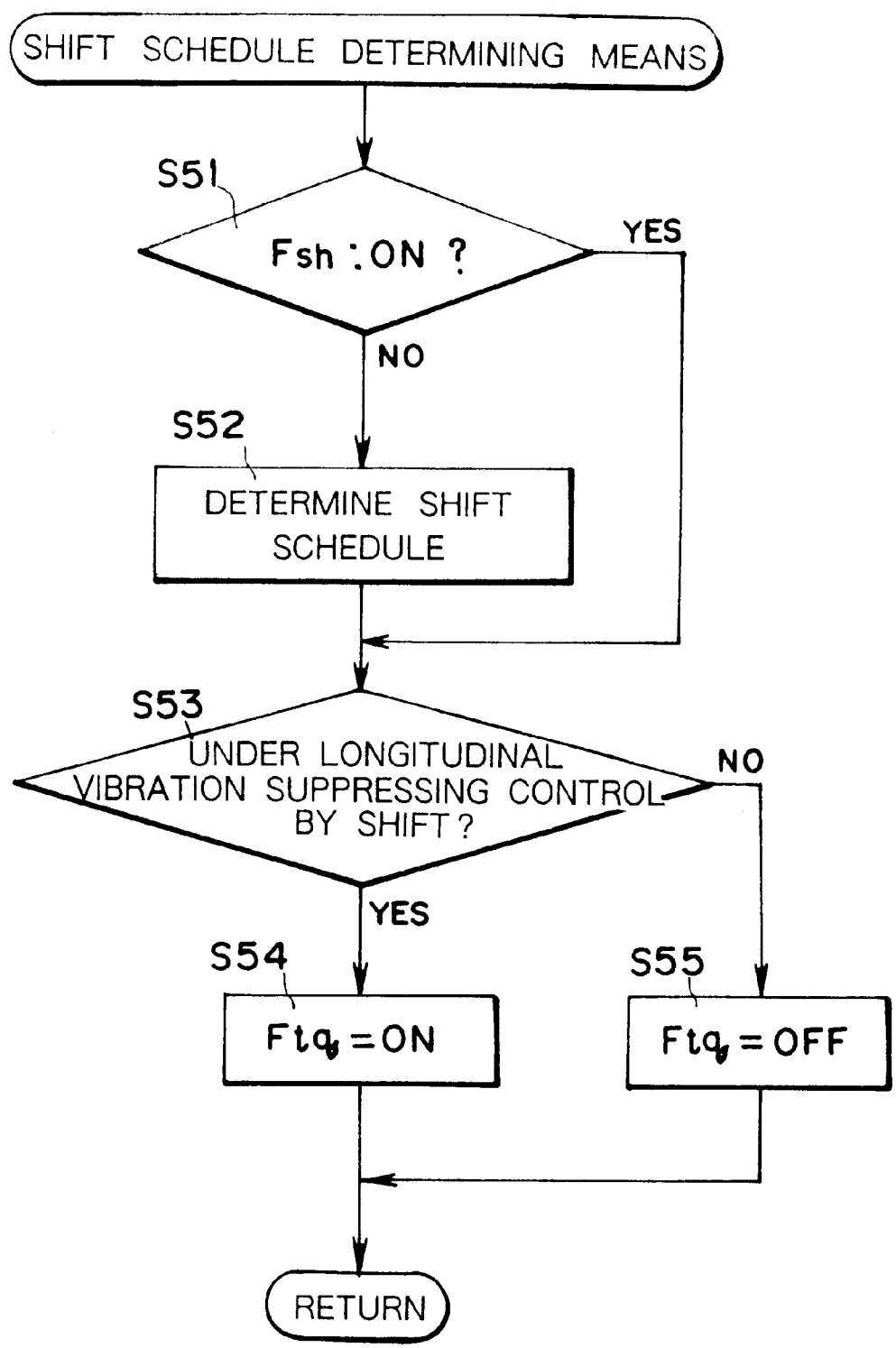
FIG. 12 is a flow chart showing one example of a control routine for inhibiting a change in the torque schedule because the suppressing control of the longitudinal vibrations of the vehicle with the shift is executed.

In FIG. 12, it is decided first of all (at Step S51) whether or not a shift schedule change inhibition flag Fsh is ON. When the flag Fsh is OFF so that the answer of Step S51 is negative, the shift schedule is determined (at Step S52). Then, it is decided (at Step S53) whether or not the control of suppressing the vehicular longitudinal vibrations according to the shift schedule is executed. Here, the routine advances directly to Step S53 when the answer of Step S51 is affirmative. When the control of suppressing the vehicular longitudinal vibrations with the shift is executed so that the answer of Step S53 is affirmative, moreover, a torque schedule change inhibition flag Ftq is turned ON (at Step S54). When the answer of Step S53 is negative, on the contrary, the torque schedule change inhibition flag Ftq is turned OFF (at Step S55).

Figure 13:
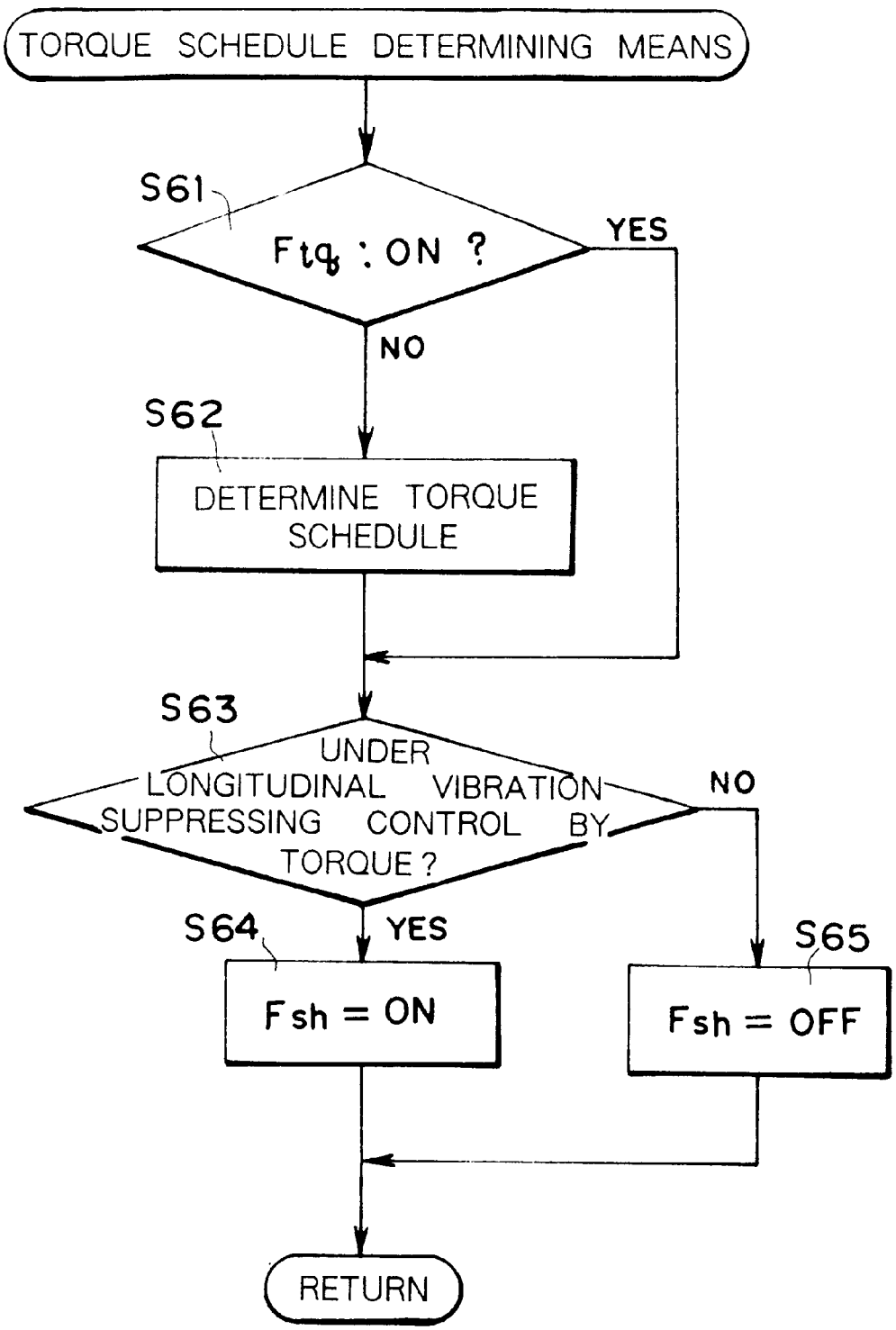
FIG. 13 is a flow chart showing one example of a control routine for inhibiting a change in the shift schedule because the suppressing control of the longitudinal vibrations of the vehicle with the engine torque is executed.

In FIG. 13, on the other hand, it is decided first of all (at Step S61) whether or not the torque schedule change inhibition flag Ftq is ON. Since this flag Ftq is set ON when the control of suppressing the vehicular longitudinal vibrations with the shift is to be executed, the torque schedule is determined (at Step S62) when the answer of Step S61 is negative because the control of suppressing the vehicular longitudinal vibrations is not executed. It is then decided (at Step S63) whether or not the control for suppressing the vehicular longitudinal vibrations according to the torque schedule is executed. Here, when the answer of Step S61 is affirmative, the change of the torque schedule is inhibited so that the routine instantly advances to Step S63. When the answer of Step S63 is affirmative, that is, when the control of suppressing the vehicular longitudinal vibrations by changing the engine torque is executed, the shift schedule change inhibition flag Fsh is turned ON (at Step S61), so that the change of the shift schedule is inhibited, as shown in FIG. 12. When the answer of Step S63 is negative, on the contrary, the shift schedule change inhibition flag Fsh is turned OFF (at Step S65). In this case, therefore, the change of the shift schedule is allowed.

Figure 14:
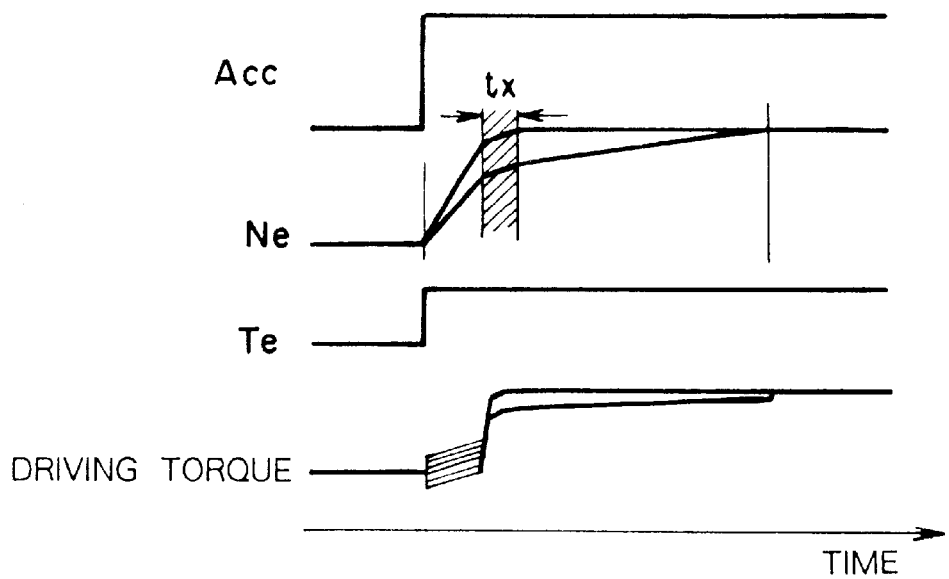
FIG. 14 is a diagram illustrating a schedule change inhibition period schematically.
Figure 15:
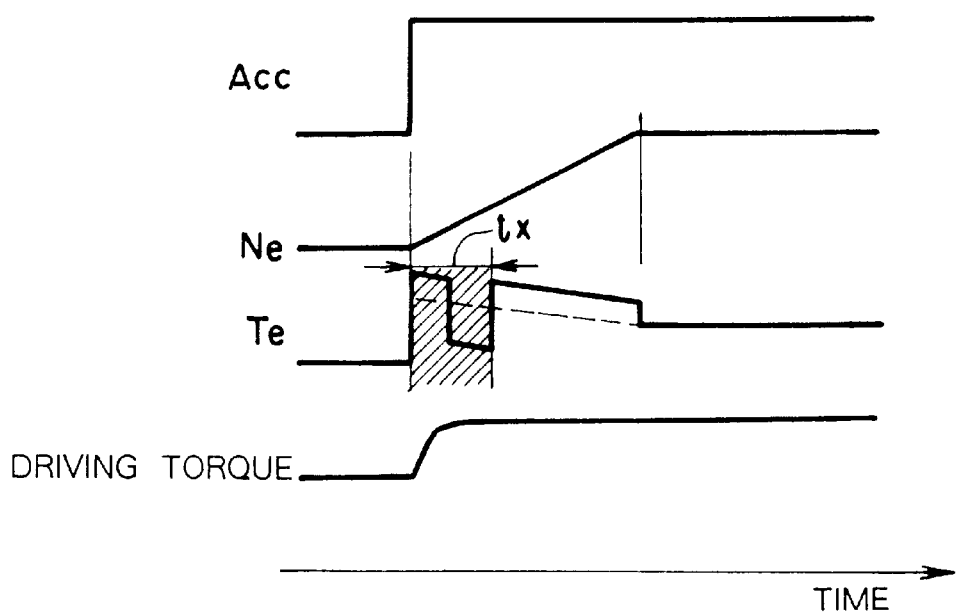
FIG. 15 is a diagram illustrating a schedule change inhibition period schematically.

Examples of the period, for which the change of the schedule is inhibited by the control shown in FIGS. 12 and 13, are illustrated in FIGS. 14 and 15. In the example illustrated in FIG. 14, an allowance torque is low, and the vehicle speed is high (or the shifting rate is high), so that the control of suppressing the vehicular longitudinal vibrations is executed by lowering the shifting rate at the shift ending time. In this case, therefore, the changes of the control schedules for the shifting rate and the engine torque are inhibited for the time period tx for which the shifting rate is changed for suppressing the vehicular longitudinal vibrations. Even with the accelerator operation for this period tx, therefore, the control of the engine output and the shift based on the accelerator operation are not executed.

On the other hand, FIG. 15 presents an example of the case in which the allowance torque is high whereas the vehicle speed is low (or the shifting rate is low). The control of suppressing the vehicular longitudinal vibrations is executed by the engine torque. In this case, therefore, for the time period tx for which the engine torque is changed to suppress the vehicular longitudinal vibrations, the changes of the schedules for controlling the shifting rate and the engine torque are inhibited. Even with the accelerator operation for that period tx, therefore, the control of the engine output and the shift on the basis of the accelerator operation are not executed.

Here will be described the relations to the invention. The functions of Steps S52, S53, S62 and S63 correspond to means for suppressing the vehicular longitudinal vibrations in the invention, and the functions of Steps S51, S54, S61 and S64 correspond to means for inhibiting the change of the schedule.

Here, the shift in the continuously variable transmission 2 is demanded to proceeds as promptly as possible within the range in which factors to deteriorate the riding comfort such as the shift shocks do not occur. Therefore, the shifting rate is generally determined on the basis of the vehicle speed, the throttle opening or the engine speed at the instant when a shift is demanded. Therefore, the so-called "shift period T1" till the engine speed Ne reaches the target speed Net changes to long or short depending upon the shifting conditions.

In recent years, on the other hand, there has been developed the engine which can control the output torque arbitrarily while having a high control responsiveness. The engine is exemplified by the engine equipped with an electronically controlled throttle valve or the direction fuel injection type engine. In the engine of this kinds, the output torque can be promptly controlled in a high accuracy so that the engine torque control can be utilized for the control of suppressing the vehicular longitudinal vibrations at the time of starting the change in the engine torque. The control of suppressing the vehicular longitudinal vibrations with the engine torque is to raise, decrease or increase/decrease the engine torque in accordance with the period of the vibrations, so that the control period is restricted by the period of the vehicular longitudinal vibrations, i.e., the natural vibration period of the vehicle body.

Specifically in the case of the control of the so-called "pulse type" for suppressing the vehicular longitudinal vibrations by raising the engine torque to the target torque at the instant of demanding a rise in the output, by lowering the engine torque just after the rise and by raising again the engine torque to the target torque, a period Ts for the engine torque to be increased/decreased in a pulsating manner is one third of the natural vibration period of the vehicle. Specifically: the engine torque is raised to the target torque for one sixth of the natural vibration period from the instant of demanding the output rise; the engine torque is lowered for the subsequent one sixth of the natural vibration period; and the engine torque is then raised to the target torque. As has been described with reference to FIG. 1, on the other hand: the engine torque is raised to the torque which is the sum of one half of the target engine torque and the inertial torque; this state is maintained for the half period of the vehicular longitudinal vibrations; and the engine torque is then raised to the target torque. This control is called the "step type control", in which the control period Ts for suppressing the vehicular longitudinal vibrations is one half period.

Figure 16:
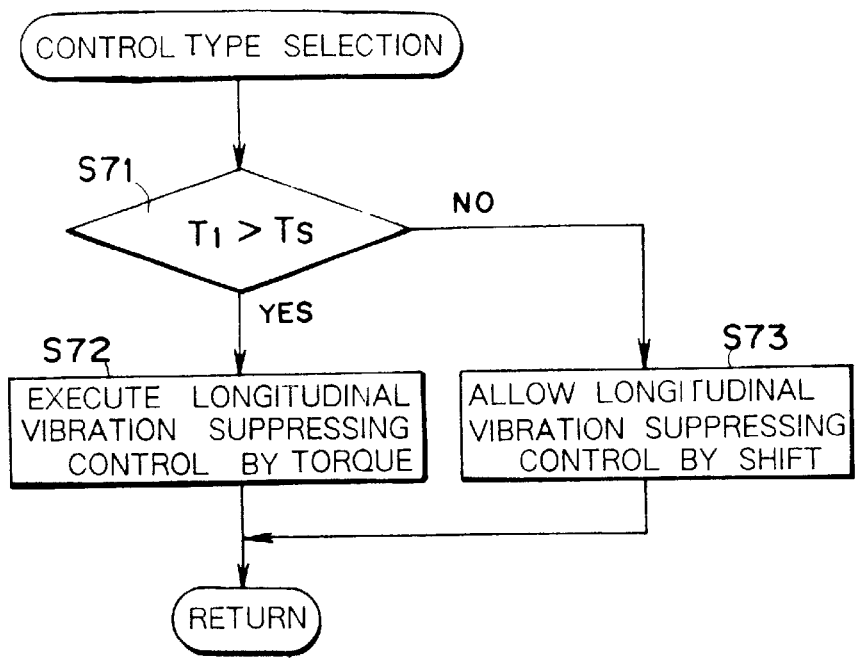
FIG. 16 is a flow chart showing one example of a routine for selecting a method of the suppressing control of the longitudinal vibrations of the vehicle.

In the invention, therefore, the control of suppressing the vehicular longitudinal vibrations with the engine torque is executed preferentially at the shift stating time, if it is allowed. This control example is illustrated by a flow chart in FIG. 16. At Step S71, there are compared the aforementioned shift period T1 with the period Ts for suppressing the vehicular longitudinal vibration with the engine torque. On the other hand, this vehicular longitudinal vibration suppressing period Ts is one half or one third of the natural vibration period of the vehicle.

When the period Ts for suppressing the vehicular longitudinal vibrations with the engine torque is shorter than the shift period T1 so that the answer of Step S71 is affirmative, moreover, the control of suppressing the vehicular longitudinal vibrations with the engine torque is executed (at Step S72). When the period Ts for suppressing the vehicular longitudinal vibrations with the engine torque is longer than the shift period T1 so that the answer of Step S71 is negative, on the contrary, the control of suppressing the vehicular longitudinal vibrations with the shift is allowed (at Step S73). In other words, when the answer of Step S71 is negative, the control of suppressing the vehicular longitudinal vibrations by controlling the shifting rate is not always executed. This is because the effect for suppressing the vehicular longitudinal vibrations by changing the shifting rate may be relatively low at the shift starting time.

Figure 17:
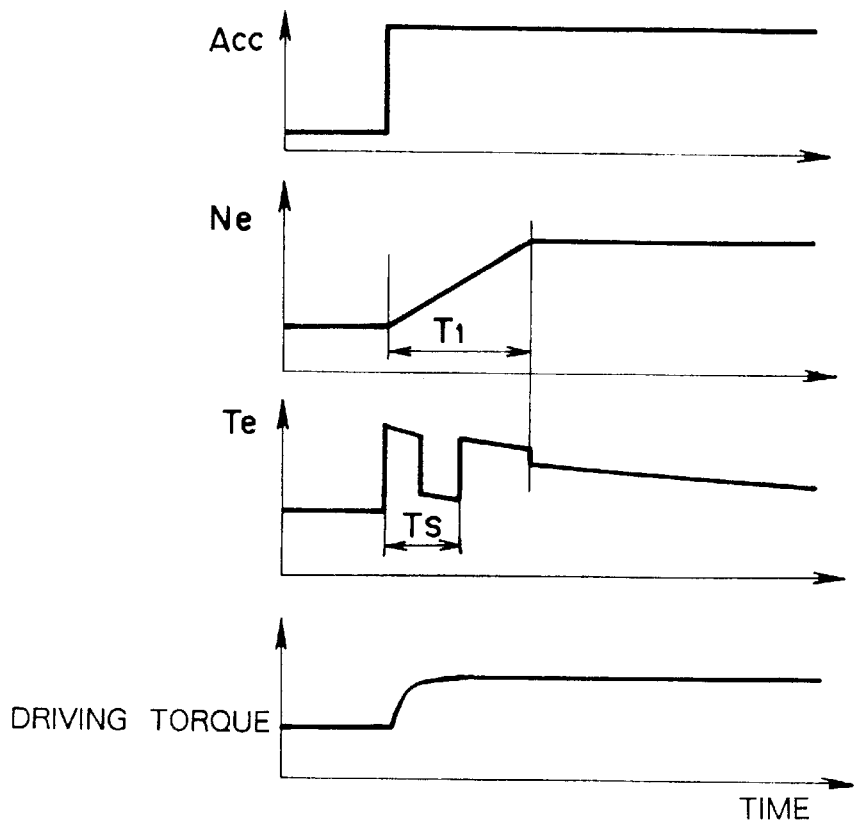
FIG. 17 is a time chart illustrating one example of a shift period and a torque control period.
Figure 18:
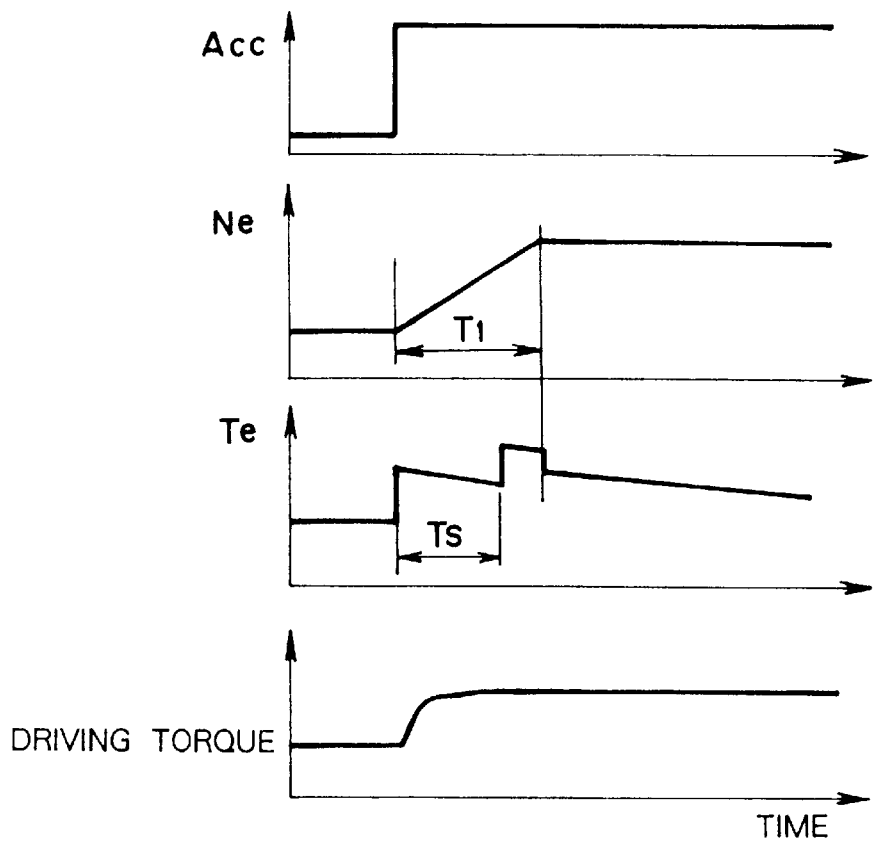
FIG. 18 is a time chart illustrating another example of a shift period and a torque control period.

Here, FIG. 17 illustrates one example of the time chart of the case in which the vehicular longitudinal vibrations are suppressed by changing the engine torque in a pulsating manner. On the other hand, FIG. 8 illustrates one example of the time chart of the case in which the vehicular longitudinal vibrations are suppressed by changing the engine torque step wise.

Therefore: the function of Step S71 corresponds to comparing means in the invention; the function of Step S72 corresponds to means for controlling the output torque of the power source in the invention; and the function of Step S73 corresponds to allowing means.

Figure 19:
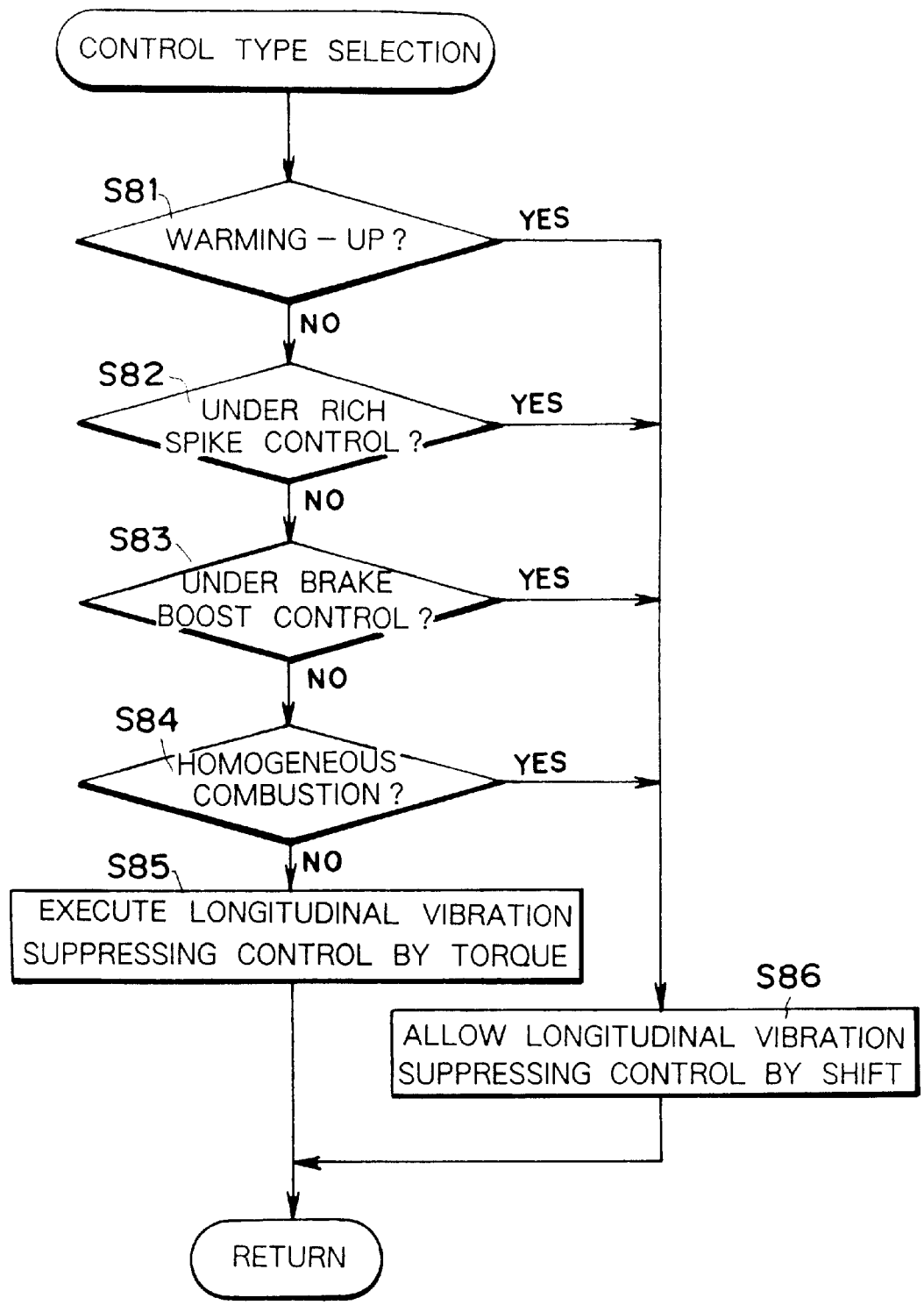
FIG. 19 is a flow chart showing one example of a routine for selecting the method of the suppressing control of the longitudinal vibrations of the vehicle on the basis of the acting state of an engine.

When the vehicular longitudinal vibrations are to be suppressed with the engine torque, this engine torque is increased/decreased after all according to the vehicular longitudinal vibrations to be anticipated to occur. For this control, therefore, it is necessary to change the engine torque accurately and promptly. On the other hand, there are various factors for changing the engine torque of the vehicle or for influencing the control of the engine torque. In the control system according to the invention, therefore, when the control of the engine torque is restricted, the vehicular longitudinal vibrations are suppressed not with the engine torque but with the shift. This control is exemplified by a flow chart in FIG. 19. When the condition for starting the control of suppressing the vehicular longitudinal vibrations, more specifically, it is decided: (at Step S81) whether or not the engine is being warmed up; (at Step S82) whether or not the engine is under a rich spike control; (at Step S83) whether or not the engine is under a brake boost control; and (at Step S84) whether or not the engine is in a homogeneous combustion.

Here, in the warming-up run to be decided at Step S81, the temperature rise is promoted by feeding more fuel when the temperature of the engine 1 is low. As the temperature rises, moreover, the fuel feed is gradually reduced. In this state, therefore, the engine torque is not stable but hard to control accurately. In the rich spike control to be decided at Step S82, on the other hand, the nitrogen content, as adsorbed by an adsorption type ternary catalyzer for purifying the exhaust gas is released by lowering (or enriching) the air fuel ratio. In the state executing this control, therefore, the control of the engine torque is unstable. In the brake boost control to be decided at Step S83, moreover, the vacuum to assist the brake operation is raised to a higher level. In the aforementioned case of the direct fuel injection type engine, the combustion is made with the mixture being homogeneously diffused in the cylinder. As a result, the control of the engine torque is not always accurate, and the responsiveness may be lowered. In the homogenous combustion state to be decided at Step S84, moreover, the combustion is made by diffusing the mixture homogeneously in the cylinder of the direct fuel injection type engine, and this running state is set according to the state of a load, for example.

When any of the answers of Steps S81 to S84 is negative, the combustion in the engine 1 is stable, and the torque can be controlled accurately and promptly. In this case, therefore, the control of suppressing the vehicular longitudinal vibrations with the engine torque is executed (at Step S85). When any of the answers of Steps S81 to S84 is affirmative, on the contrary, the engine torque may not be controlled accurately and promptly. In this case, therefore, the control of suppressing the vehicular longitudinal vibrations with the shift is executed (at Step S86). These control examples for suppressing the vehicular longitudinal vibrations with the engine torque and with the shift have been described with reference to FIGS. 1 and 2.

Therefore, the functions of Steps S81 to S84 correspond to means for detecting a low control responsiveness in the invention, and the function of Step S86 corresponds to means for preferring the control of suppressing the vehicular longitudinal vibrations by changing the shifting rate.

As has been described in connection with the foregoing specific examples, the change in the engine torque when a demand for changing the driving force such as an acceleration raises a major cause for the vehicular longitudinal vibrations at the shift starting time. At the shift ending time, on the other hand, the inertial torque accompanying the shift raises a major cause for the vehicular longitudinal vibrations. In order to prevent the vehicular longitudinal vibrations at the shifting time, therefore, the change in the engine torque and the shifting rate may be made slow. However, the shift takes a long time to deteriorete the shift responsiveness. Therefore, the control system of the invention executes the following controls so as to sastisfy the contrary conditions for suppressing the vehicular longitudinal vibrations and for improving the shift responsiveness.

Figure 20:
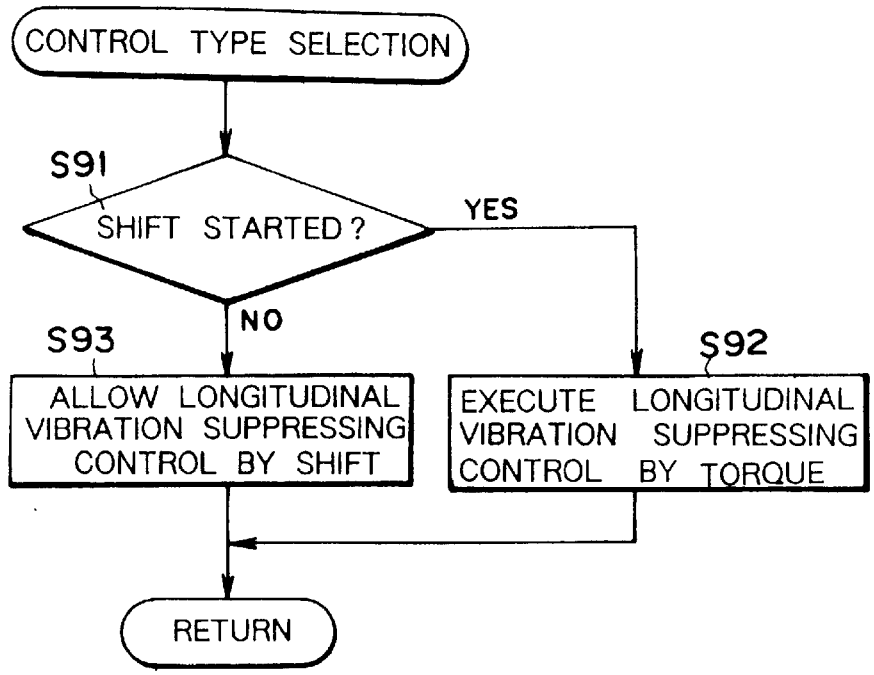
FIG. 20 is a flow chart showing one example of a routine for selecting the method of the suppressing control of the longitudinal vibrations of the vehicle on the basis of the timing of a shift.

FIG. 20 is a flow chart for explaining the control example. First of all, it is decided (at Step S91) whether or not the shift is to be started. Specifically, it is decided whether the present time is at the shift starting time or immediately after the starting time. This decision can be made, for example, in terms of the lapse time from the output of the shift signal based on the input data. When the answer of this Step S91 is affirmative, the control of suppressing the vehicular longitudinal vibrations with the engine torque is executed (at Step S92). When the answer of Step S91 is negative, that is, when some time period has elapsed from the start of the shift, on the contrary, the control of suppressing the vehicular longitudinal vibrations with the shift is executed (at Step S93).

Figure 21:
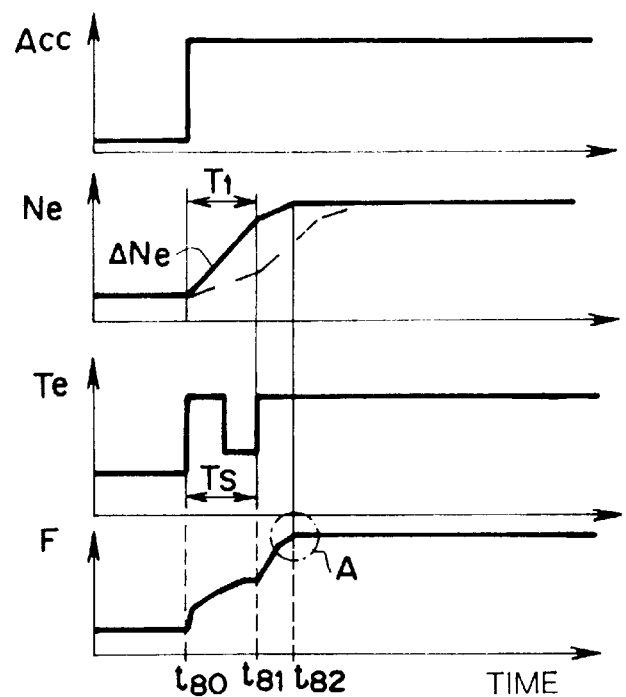
FIG. 21 is a diagram illustrating one example of a time chart of the case in which the control is made according to the control routine shown in FIG. 20.

A specific example of the control of suppressing the vehicular longitudinal vibrations is illustrated in a time chart in FIG. 21. When an acceleration demand by depressing the accelerator pedal is detected at an instant t80, the engine torque Te is raised to the target torque Ttgo based on the acceleration demand. This state is continued for one sixth of the period of the vehicular longitudinal vibrations (i.e., the natural vibration period of the vehicle) t0, as anticipated to occur according to the rise in the engine torque. At the instant when that period elapses, the engine torque Te is lowered by the actual target engine torque Ttg. In other words, the engine torque Te is lowered by the torque which is raised to establish the target engine torque. This state is continued to an instant t81 when the period t0/6 elapses, and the engine torque is then raised to the target torque Ttgo. In other words, by vehicular longitudinal vibrations at the shift starting time are suppressed by changing the engine torque Te in the pulsating manner. On the other hand, the shifting rate is lowered from the instant t81 to an instant t82 when the engine speed reaches the target speed thereby to suppress the vehicular longitudinal vibrations.

On the other hand, the control to raise the gear ratio is started at the instant t80 when the acceleration demand is detected, but the shifting rate ΔNe is enlarged as high as possible. Specifically, the vehicular longitudinal vibrations at the shift starting time are suppressed by changing the engine torque Te in the pulsating manner, for example, so that the shifting rate ΔNe can be set without any especial consideration into the vehicular longitudinal vibrations. Specifically, the shifting rate ΔNe is set by the following Formula:

$$\Delta Ne = (Neo - Nei)/Ts.$$

Here: letters Neo designate the target engine speed; letters Nei designate the actual engine speed; and letters Ts designate the period for the control of suppressing the vehicular longitudinal vibrations by the engine torque and have one sixth (i.e., t0/6) of the period of the vibrations.

For the period in which the engine torque Te is changed in the pulsating manner, therefore, the shift is executed while keeping the shifting rate ΔNe at a predetermined value. This shifting rate is substantially halved, and this state is continued for one half period of the vehicular longitudinal vibrations, as anticipated to occur at the shift ending time. That is, this is the control of suppressing the vehicular longitudinal vibrations with the shifting rate, as has already been described hereinbefore.

According to this control shown in FIGS. 20 and 21, the shifting rate can be raised while suppressing the vehicular longitudinal vibrations at the shift starting time so that the shift responsiveness is improved. Especially at the acceleration time, the acceleration (as indicated by A in FIG. 21) immediately before the driving force reaches the target value is so high that the acceleration felt by the driver can be satisfied. Here in FIG. 21, a shifting rate of the control example of the prior art, in which the aforementioned control is not performed, is indicated by a broken curve. In the prior art, the shifting rate cannot be made so high that the time period till the shift end is long to leave a room for further improvements in the shift responsiveness.

Here: the function of Step S91 corresponds to the detecting means in the invention; the function of Step S92 corresponds to the means for controlling the output torque of the power source in the invention; and the function of Step S93 corresponds to the allowing means in the invention.

Although the invention has been described in connection with its specific examples, it should not be limited thereto but could also be applied to the control of the case in which not only the acceleration demand but also a deceleration demand is made. At the deceleration time, therefore, the inertial torque occurs as it is at the shift starting time so that the shifting rate or the engine torque is controlled to offset the inertial torque. At the shift ending time, on the other hand, the engine torque or the shifting rate is controlled to supplement the driving torque by the inertial torque.

In the individual specific examples thus far described, on the other hand, the period for controlling the engine torque or the shifting rate is one half of the period for the vehicular longitudinal vibrations but might be one considering the viscosity of the power transmission line. In this modification, the period is slightly different from the half period.

Here will be synthetically described the advantages to be achieved from the invention. According to the invention, as has been described hereinbefore, even at the start of a shift to be caused according to a demand for changing the output of the power source, the vehicular longitudinal vibrations, as caused due to the change in the driving force, can be effectively suppressed. Since the control is made to suppress the vehicular longitudinal vibrations with the output of the power source, moreover, the driving force or the gear ratio can be changed for a short time period so that the shift responsiveness or the acceleration is improved.

According to the invention, on the other hand, in addition to the improvement in the shift responsiveness or the acceleration, at the shift starting time, the inertial torque to accompany the shift can be controlled to offset or supplement with the output torque of the power source so that the feeling of shortage or excess of the driving torque at the shift starting time can be avoided in advance.

According to the invention, when the gear ratio reaches the target gear rate at the shift ending time so that the shifting rate becomes substantial zero, the output torque of the power source changes to offset or supplement the inertial torque accompanying the change in the shifting rate so that the overshoot or fall of the driving torque and the vehicular longitudinal vibrations, as caused thereby, can be reliably prevented.

According to the invention, when the inertial torque to occur at the shift ending time cannot be offset or supplemented by the output torque of the power source, the shifting rate is changed in advance so that the vehicular longitudinal vibrations can be effectively suppressed or prevented by avoiding the influences due to the inertial torque at the shift ending time.

According to the invention, the influences of the inertial torque when the gear ratio changes are eliminated by both the output torque of the power source and the shifting rate so that the change in the driving torque can be smoothed to prevent the vehicular longitudinal vibrations effectively.

According to the invention, the condition for premising the control of suppressing the vehicular longitudinal vibrations, i.e., the predicted value or the imagined value of the output of the power source or the shifting rate does not change during the suppressing control so that the control of suppressing the vehicular longitudinal vibrations can be satisfactorily executed.

According to the invention, the control for suppressing the vehicular longitudinal vibrations is frequently executed by controlling the output torque of the power source so that the vehicular longitudinal vibrations can be more effectively suppressed or prevented.

According to the invention, the insufficient control of the vehicular longitudinal vibrations because the output torque of the power source fails to be the control target value can be avoided in advance to effect the control of suppressing the vehicular longitudinal vibrations.

According to the invention, moreover, the vehicular longitudinal vibrations can be reliably suppressed or prevented even if the shifting rate is raised at the shift starting time, so that the time period for the shift can be shortened to improve the shift responsiveness or the acceleration.

What is claimed is:

1. A control system of a vehicle having a continuously variable transmission, in which the continuously variable transmission capable of changing a gear ratio continuously is coupled to the output side of a power source to control an the output torque of said power source in accordance with an inertial torque accompanying the change in the gear ratio, comprising:

output torque control means for controlling the output torque of said power source to a torque according to both said inertial torque and a target torque based on a demand for changing the driving force of said vehicle.

2. A control system according to claim 1, wherein said output torque control means includes means for making a calculation by dividing the product of a target speed of said power source and said target torque by an actual output speed of said power source on the basis of the demand for changing the driving force of said vehicle, and by adding said inertial torque.

3. A control system according to claim 1, wherein said inertial torque is determined on the basis of an inertial moment of a power transmission line including said power source on the input side of said continuously variable transmission and the change in the speed of said power transmission line.

4. A control system according to claim 1, wherein said power source includes an internal combustion engine for outputting a torque according to the amount of fuel fed, and wherein said output torque control means includes means for controlling the amount of fuel fed so that the smaller one of a torque according to said target torque and the maximum torque to be outputted by said internal combustion engine may be outputted.

5. A control system according to claim 1, further comprising:

means for controlling the output torque of said power source on the basis of the inertial torque accompanying the start of the change in said gear ratio, so as to establish no pulsation in the driving torque.

6. A control system according to claim 1, further comprising:
means for controlling the output torque of said power source on the basis of the inertial torque at a shift ending time so as to establish no pulsation in the driving torque.

7. A control system according to claim 1, further comprising:
means for comparing the inertial torque at the shift ending time with an allowable change in the output torque of said power source; and
means for lowering the shifting rate immediately before the shift end when said inertial torque is larger than the allowable change in the output torque of said power source.

8. A control system according to claim 1, further comprising:
means for changing the output torque of said power source stepwise by a plurality of torques which are divided from an inertial torque to be anticipated to occur at a shift starting time or at a shift ending time; and
means for changing the shifting rate in conformity with the stepwise change in the output torque of said power source.

9. A control system according to claim 8, further comprising:
means for changing the output torque of said power source stepwise by halves of the inertial torque to be anticipated to occur at the shift starting time or at the shift ending time; and
means for halving the shifting rate in conformity with the stepwise change in the output torque of said power source.

10. A control system according to claim 1,
wherein said output torque control means includes: means for setting the output torque of said power source to one half of the torque based on said target torque; means for changing the output torque of said power source, when a shift based on a demand for changing said driving force is started, according to the inertial torque accompanying said shift; and means for changing the output torque of said power source to the summed torque of said target torque and said inertial torque at an instant when there has elapsed one half of the period of said vehicular longitudinal vibrations, as anticipated to occur when the output torque of said power source is changed to said target torque.

11. A control system according to claim 1,
wherein said output torque control means includes means for increasing/decreasing the output torque of said power source alternately to a target torque, as determined on the basis of a demand for changing the driving force of said vehicle, and a torque which is subtracted by an increase in the torque to the target torque.

12. A control system according to claim 11,
wherein said means for controlling the output torque of said power source includes means for increasing/decreasing the output torque of said power source alternately to a target torque, as determined on the basis of a demand for changing the driving force of said vehicle, and a torque which is subtracted by an increase in the torque to the target torque, for every one sixths of the period of said vehicular longitudinal vibrations, as anticipated to occur when the output torque of said power source is raised to said target torque and kept at said target torque.

13. A control system according to claim 1, further comprising:
means for keeping the changing rate of said gear ratio constant while the output torque of said power source for suppressing said vehicular longitudinal vibrations is being controlled.

14. A control system of a vehicle having a continuously variable transmission, in which the continuously variable transmission capable of changing a gear ratio continuously is coupled to the output side of a power source, comprising:
means for suppressing the vehicular longitudinal vibrations, as caused by the change in an output of said power source or by the change in a shifting rate by said continuously variable transmission, by controlling at least one of the output of said power source and the shifting rate by said continuously variable transmission; and
means for inhibiting a change in a control schedule to control the other of the output of said power source and the shifting rate by said continuously variable transmission while the control of suppressing the vehicular longitudinal vibrations by said means is being executed.

15. A control system of a vehicle having a continuously variable transmission, in which the continuously variable transmission capable of changing a gear ratio continuously is coupled to the output side of a power source for making a shift while keeping the shifting rate constant for a predetermined period based on the demand of a shift, comprising:
means for comparing said predetermined period with a control period, for which vehicular longitudinal vibrations are suppressed by changing an output torque of said power source, that is, a torque control period which is determined on the basis of the period of said vehicular longitudinal vibrations;
means for executing the control of changing the output torque of said power source to suppress the vehicular longitudinal vibrations when said torque control period is longer than said predetermined period; and
means for allowing the control of the shifting rate to suppress the vehicular longitudinal vibrations when said torque control period is shorter than said predetermined period.

16. A control system of a vehicle having a continuously variable transmission, in which the continuously variable transmission capable of changing a gear ratio continuously is coupled to the output side of a power source, comprising:
means for detecting a state in which a control responsiveness of an output torque of said power source is low; and
means for preferring the suppression of the vehicular longitudinal vibrations, as caused by a shift, by changing the shifting rate when it is detected by said means that the control responsiveness of said output torque is low.

17. A control system of a vehicle having a continuously variable transmission, in which the continuously variable transmission capable of changing a gear ratio continuously is coupled to the output side of a power source, comprising:

means for detecting the start of a shift and a later timing;

output torque control means for executing the control of an output torque of said power source for suppressing the vehicular longitudinal vibrations when the start of the shift is detected by said means; and means for allowing a control of the shifting rate by said continuously variable transmission to suppress the vehicular longitudinal vibrations after the control of suppressing the vehicular longitudinal vibrations by the output torque of said power source.

18. A control system according to claim 17, wherein said output torque control means includes means for increasing/decreasing the output torque of said power source alternately to a target torque, as determined on the basis of a demand for changing the driving force of said vehicle, and a torque which is subtracted by an increase in the torque to the target torque.

19. A control system according to claim 17, wherein said output torque control means includes means for increasing/decreasing the output torque of said power source alternately to a target torque, as determined on the basis of a demand for changing the driving force of said vehicle, and a torque which is subtracted by an increase in the torque to the target torque, for every one sixths of the period of said vehicular longitudinal vibrations, as anticipated to occur when the output torque of said power source is raised to said target torque and kept at said target torque.

20. A control system according to claim 17, further comprising:

means for keeping the changing rate of said gear ratio constant while the output torque of said power source for suppressing said vehicular longitudinal vibrations is being controlled.

* * * * *